(12) United States Patent (10) Patent No.: US 7,522,807 B2
Rolston et al. (45) Date of Patent: Apr. 21, 2009

| | | | |
|---|---|---|---|
| (54) | OPTICAL CONNECTOR ASSEMBLY | (58) | Field of Classification Search .................. None |
| | | | See application file for complete search history. |
| (75) | Inventors: David Robert Cameron Rolston, Beaconsfield (CA); Tomasz Maj, Montreal (CA) | (56) | References Cited |
| | | | U.S. PATENT DOCUMENTS |
| (73) | Assignee: Reflex Photonics Inc., Montréal, Québec (CA) | | 6,318,902 B1 * 11/2001 Igl et al. .................... 385/59<br>6,757,471 B2 * 6/2004 Jeong et al. ............... 385/137<br>2002/0039376 A1 * 4/2002 Kim et al. .................. 372/50<br>2004/0114859 A1 * 6/2004 Colgan et al. .............. 385/31 |
| ( * ) | Notice: Subject to any disclaimer, the term of this patent is extended or adjusted under 35 U.S.C. 154(b) by 636 days. | | * cited by examiner<br>*Primary Examiner*—Sung H Pak<br>*Assistant Examiner*—Hoang Tran |
| (21) | Appl. No.: 10/625,905 | | (74) *Attorney, Agent, or Firm*—Ogilvy Renault LLP |
| (22) | Filed: Jul. 24, 2003 | (57) | ABSTRACT |
| (65) | Prior Publication Data | A method and apparatus is disclosed for enabling a coupling of at least one optical fiber with an optoelectronic device. The apparatus comprises at least one v-groove for receiving at least one optical fiber. A first end of the apparatus is then polished at a predetermined angle in order to enable an optical coupling with the optoelectronic device. | |
| | US 2005/0018974 A1    Jan. 27, 2005 | | |
| (51) | Int. Cl.<br>*G02B 6/00* (2006.01) | | |
| (52) | U.S. Cl. ...................................... 385/137 | 18 Claims, 37 Drawing Sheets | |

Parallel Optical Fiber

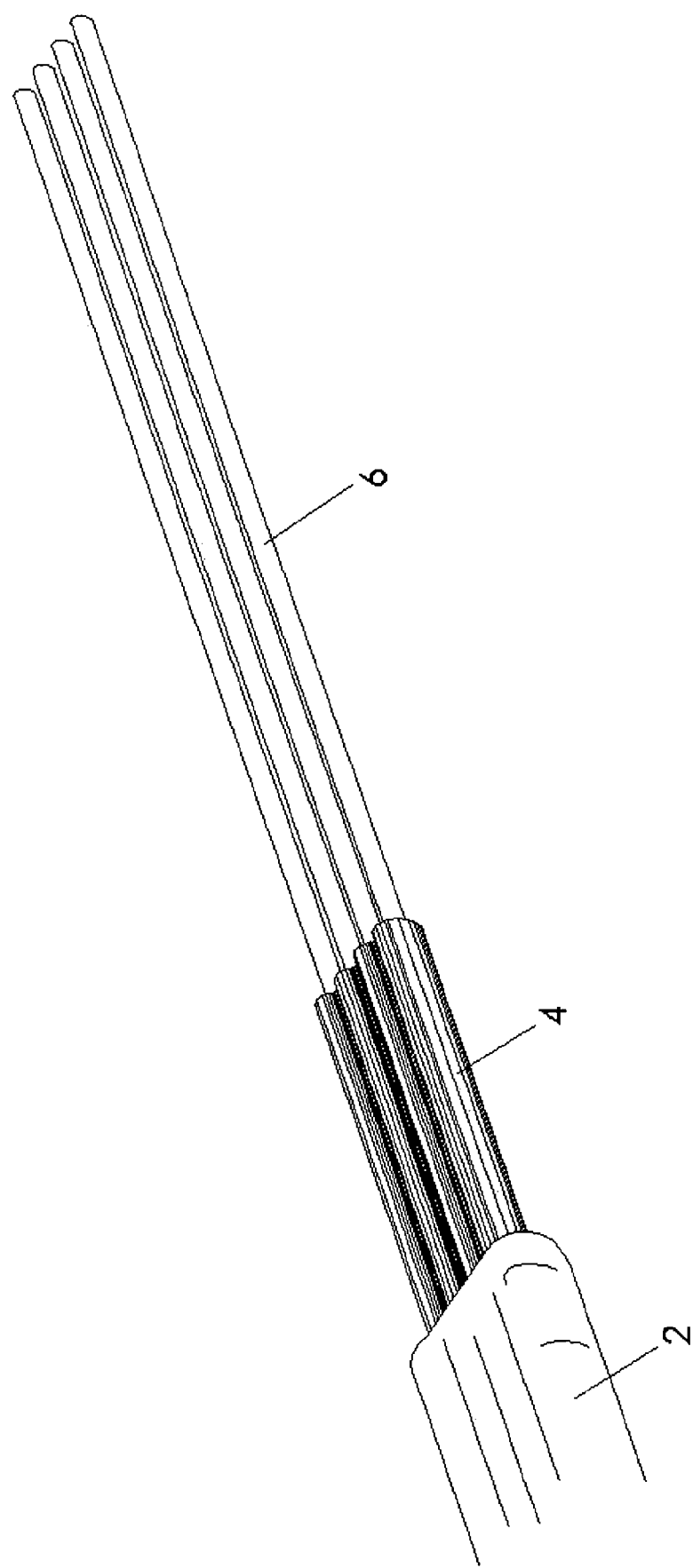
Figure 01 - Parallel Optical Fiber

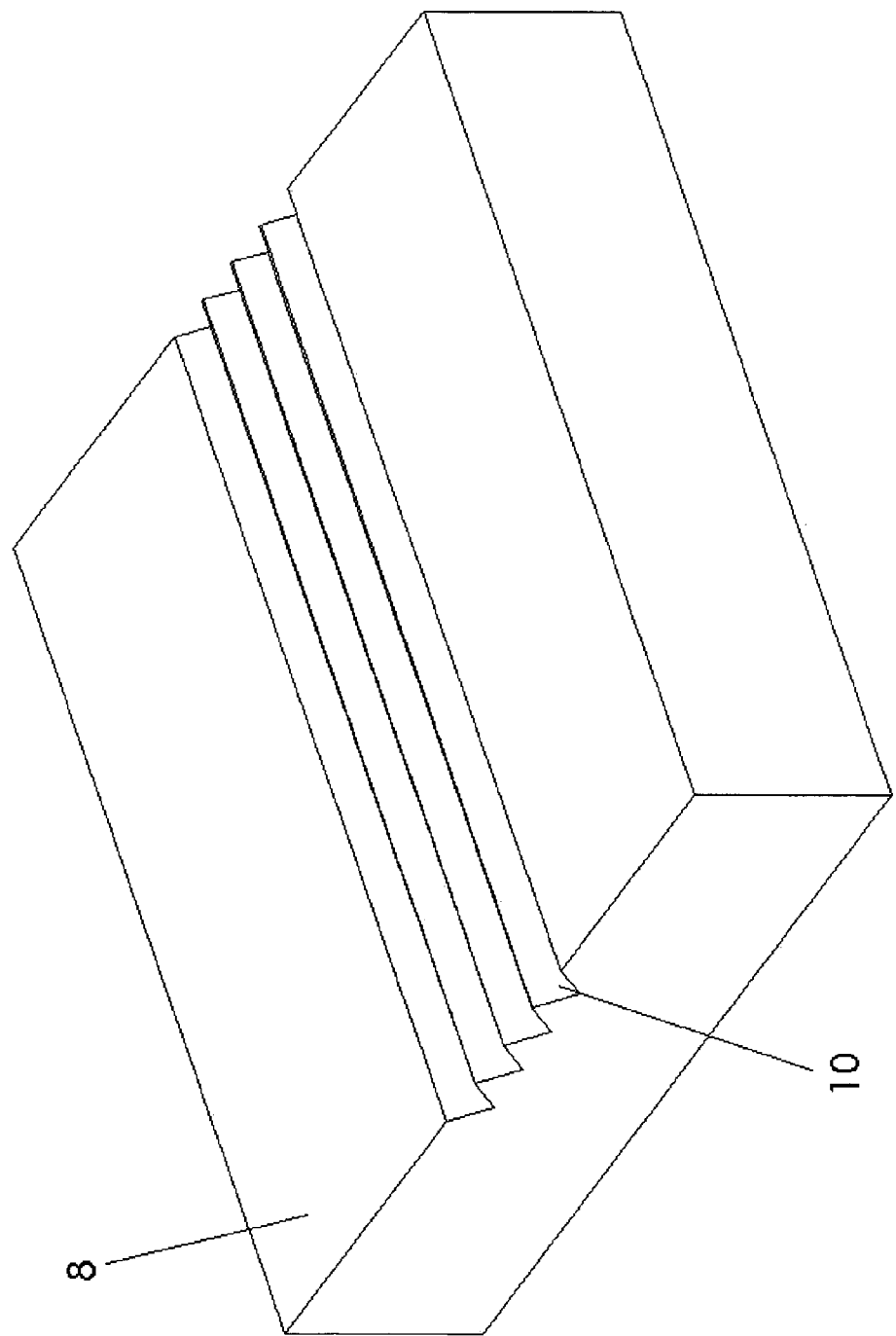
Figure 02a - Silicon V-Groove Chip (Perspective)

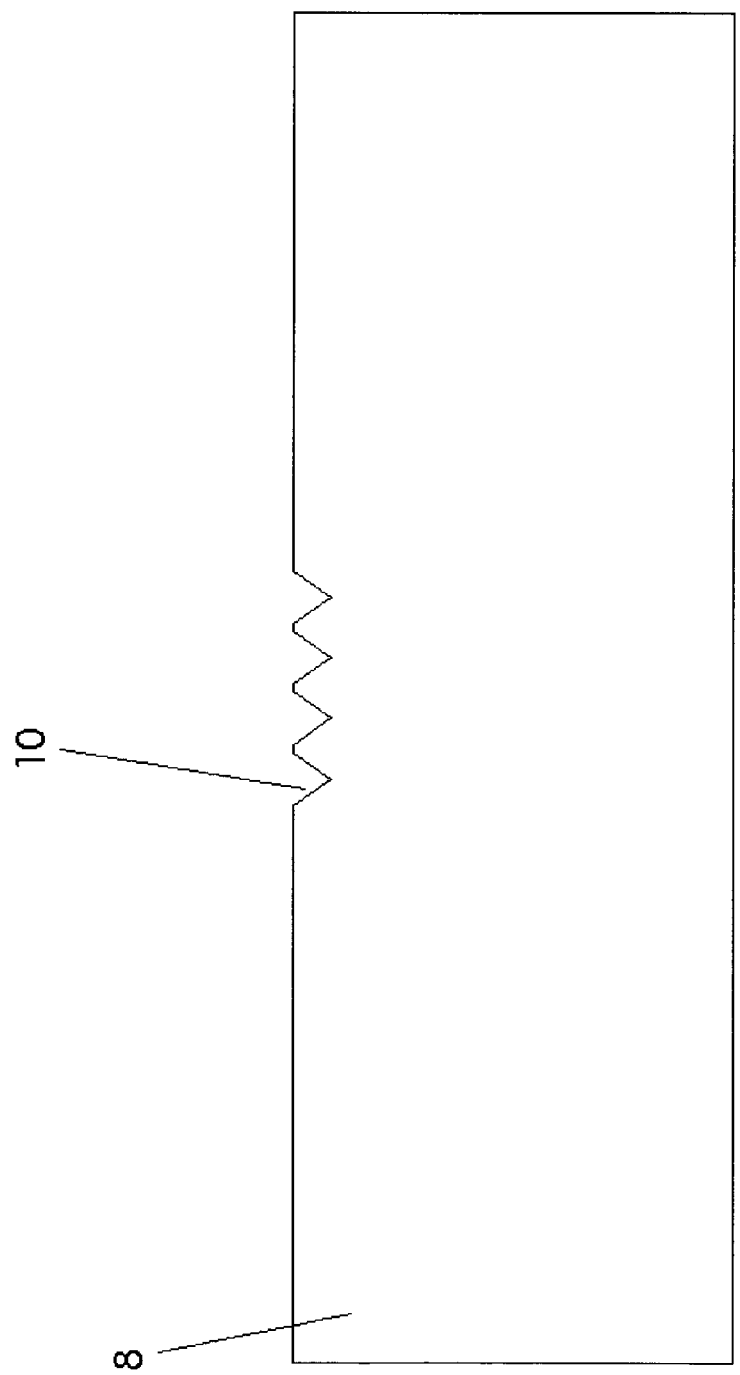
Figure 02b - Silicon V-Groove Chip (Front)

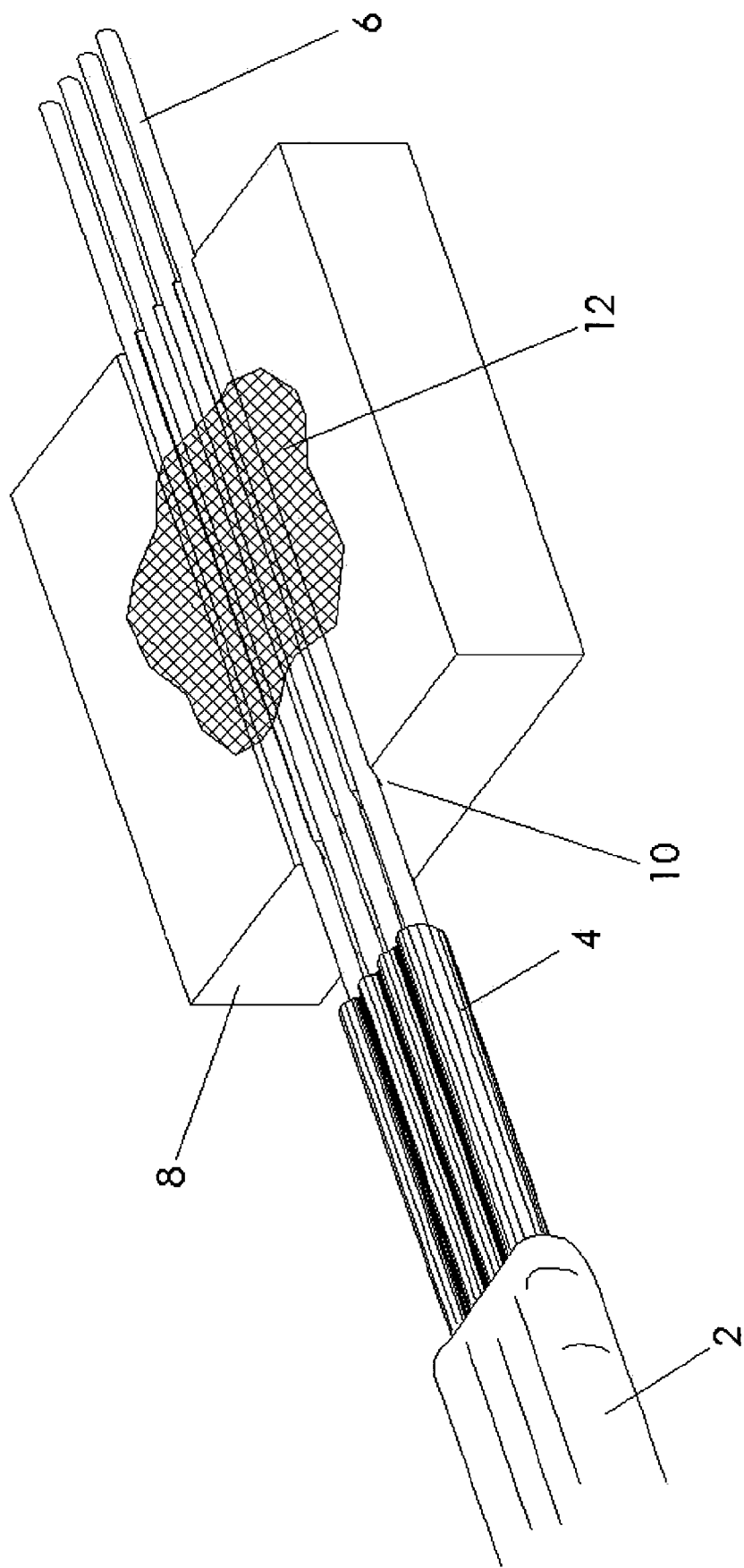
Figure 03a – Fibers with Epoxy (Perspective)

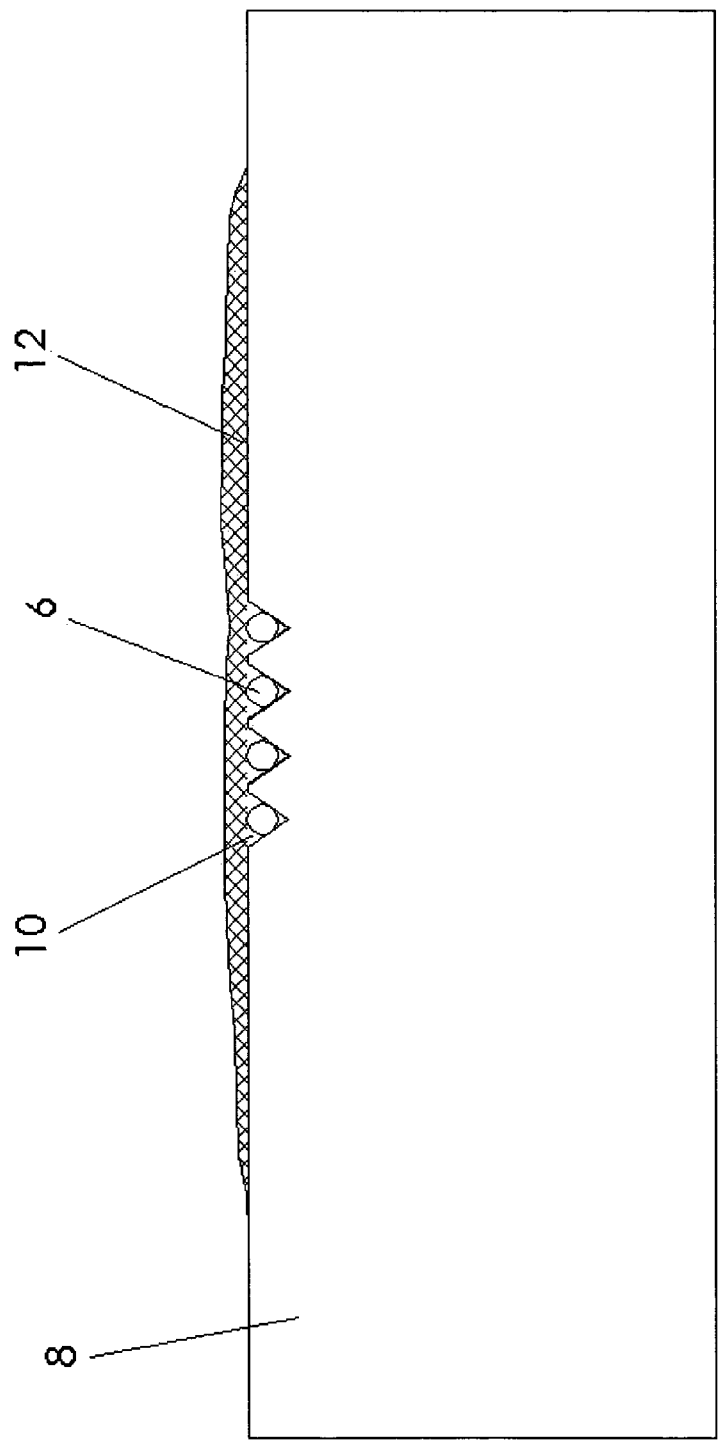
Figure 03b - Fibers with Epoxy (Front)

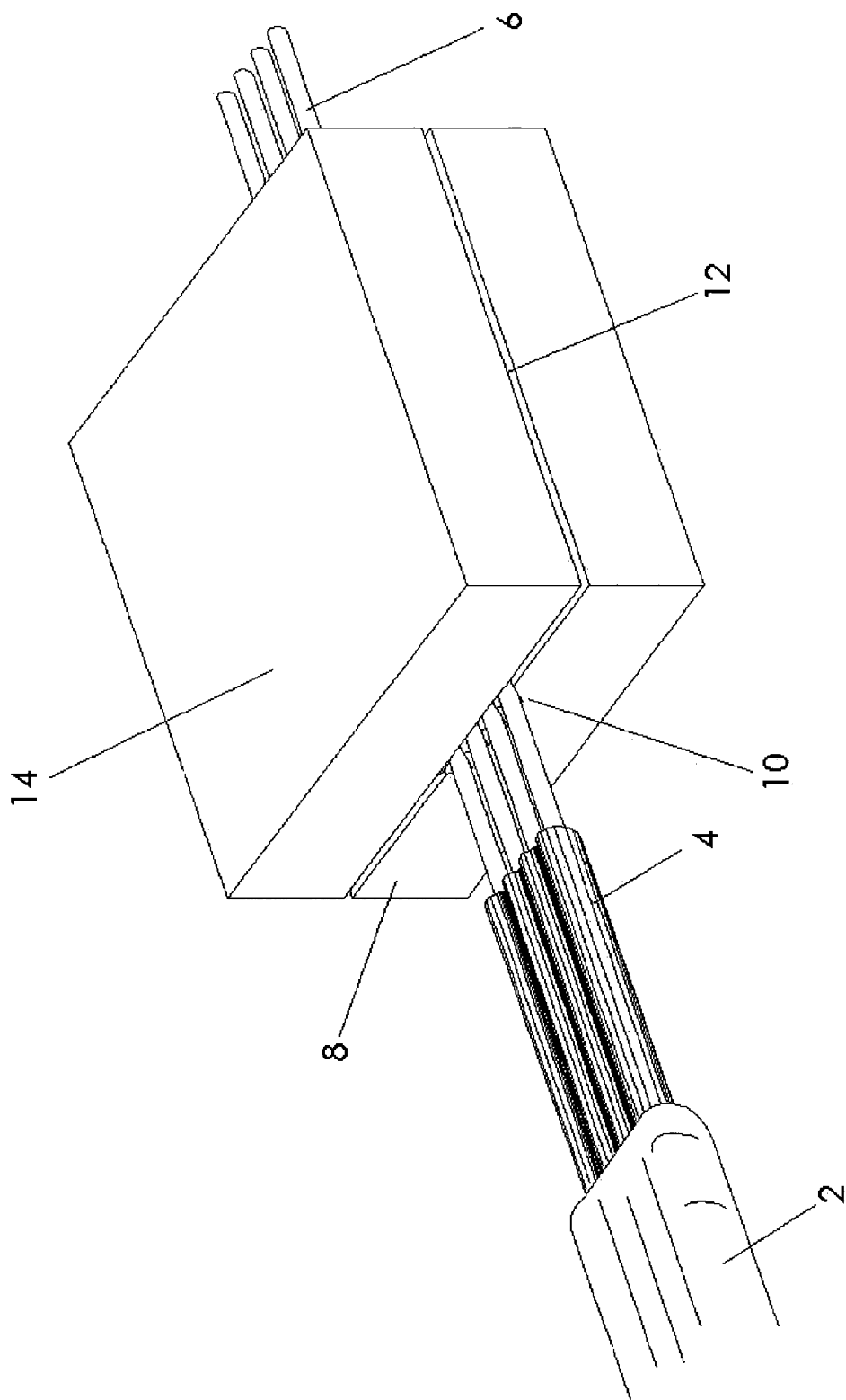
Figure 04a - Cover Plate (Glass) (Perspective)

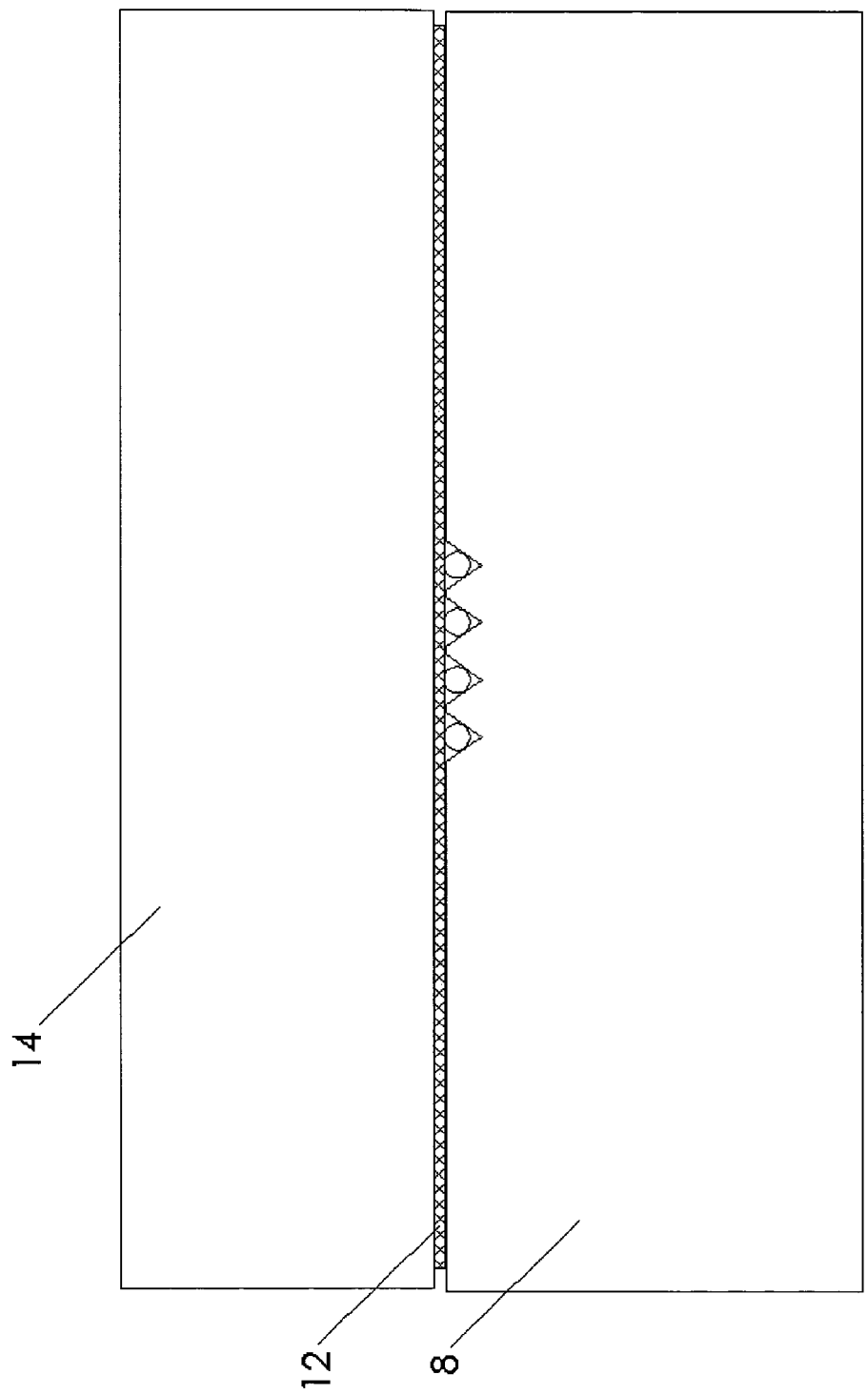
Figure 04b - Cover Plate (glass) (Front)

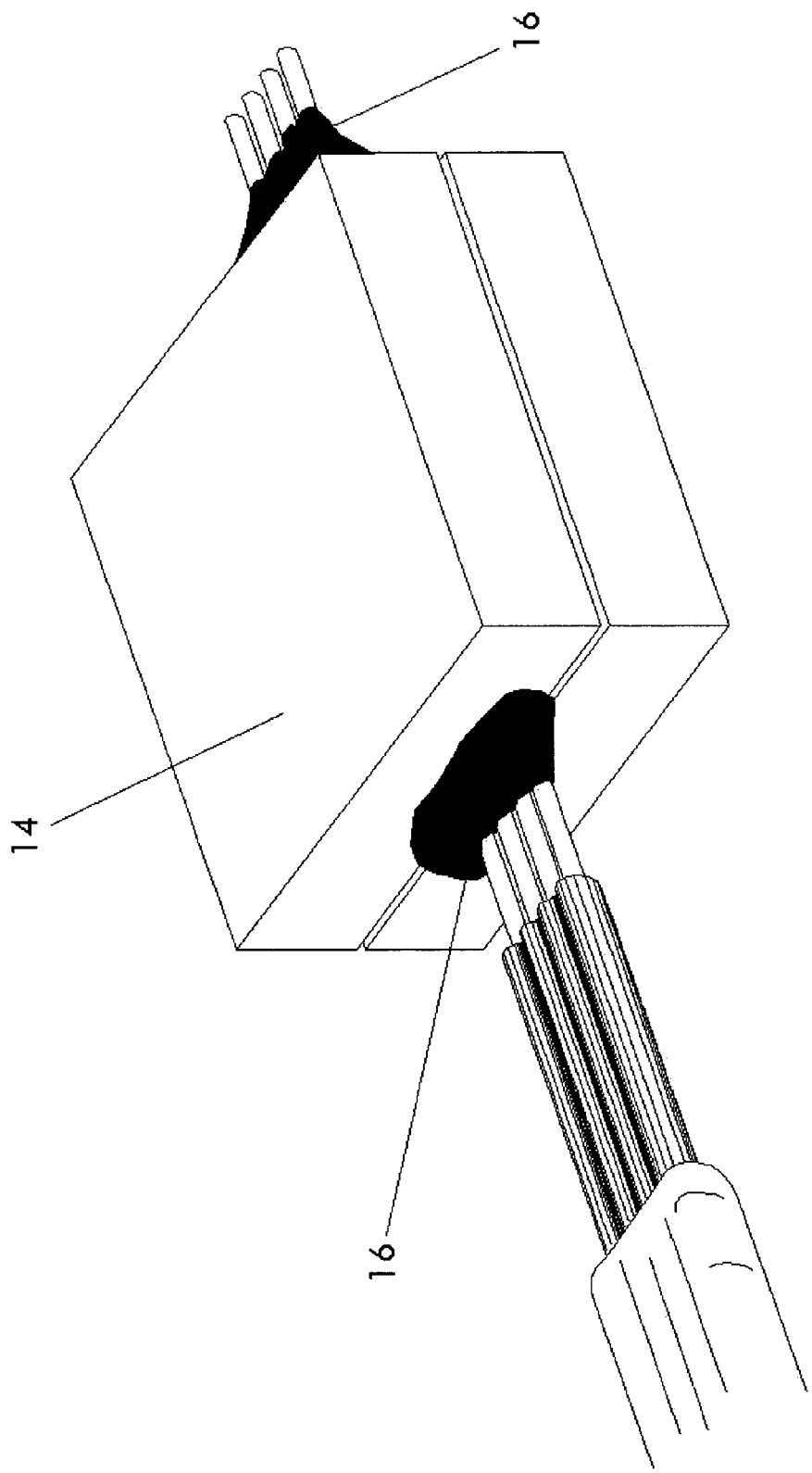
Figure 05a - Protective Epoxy (Perspective)

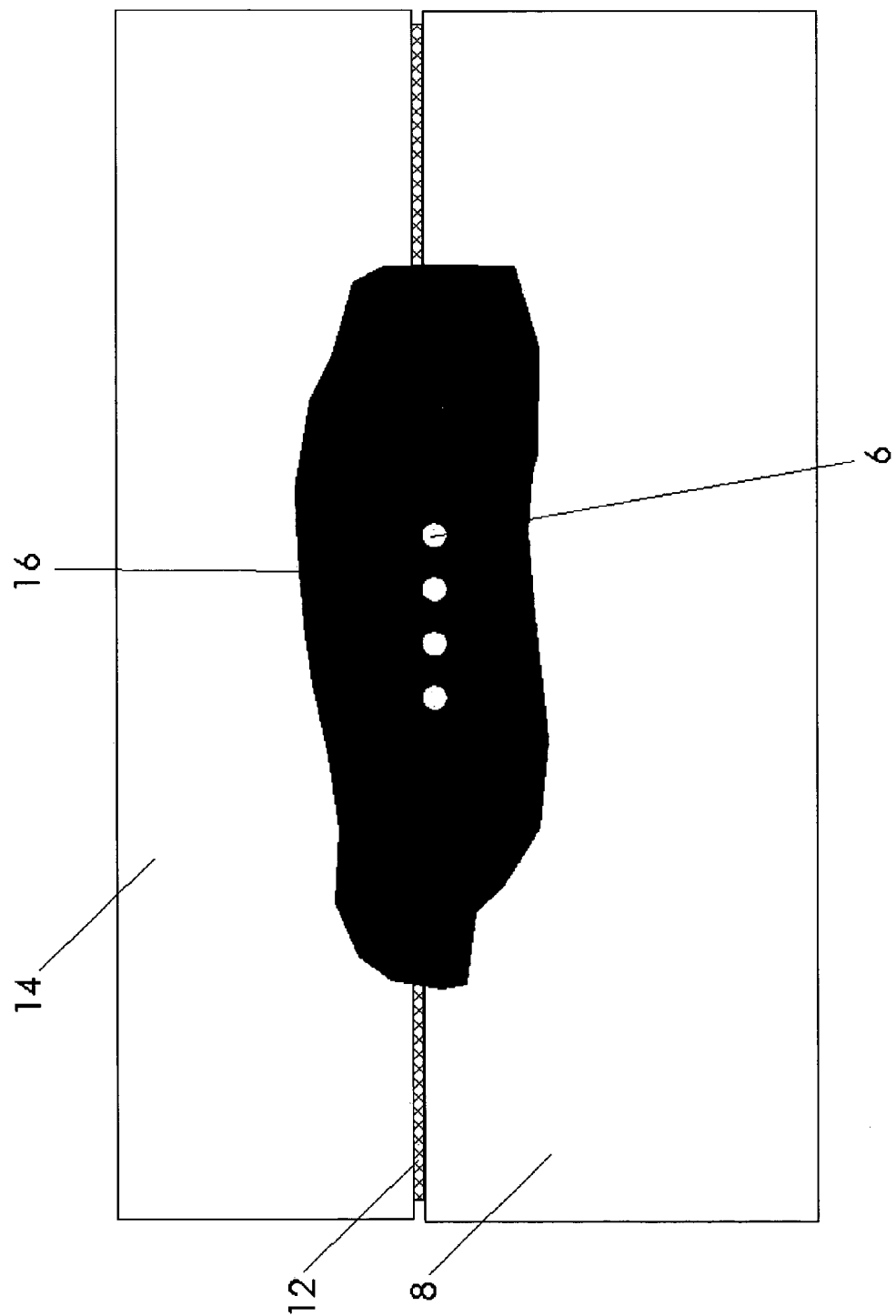
Figure 05b - Protective Epoxy (Front)

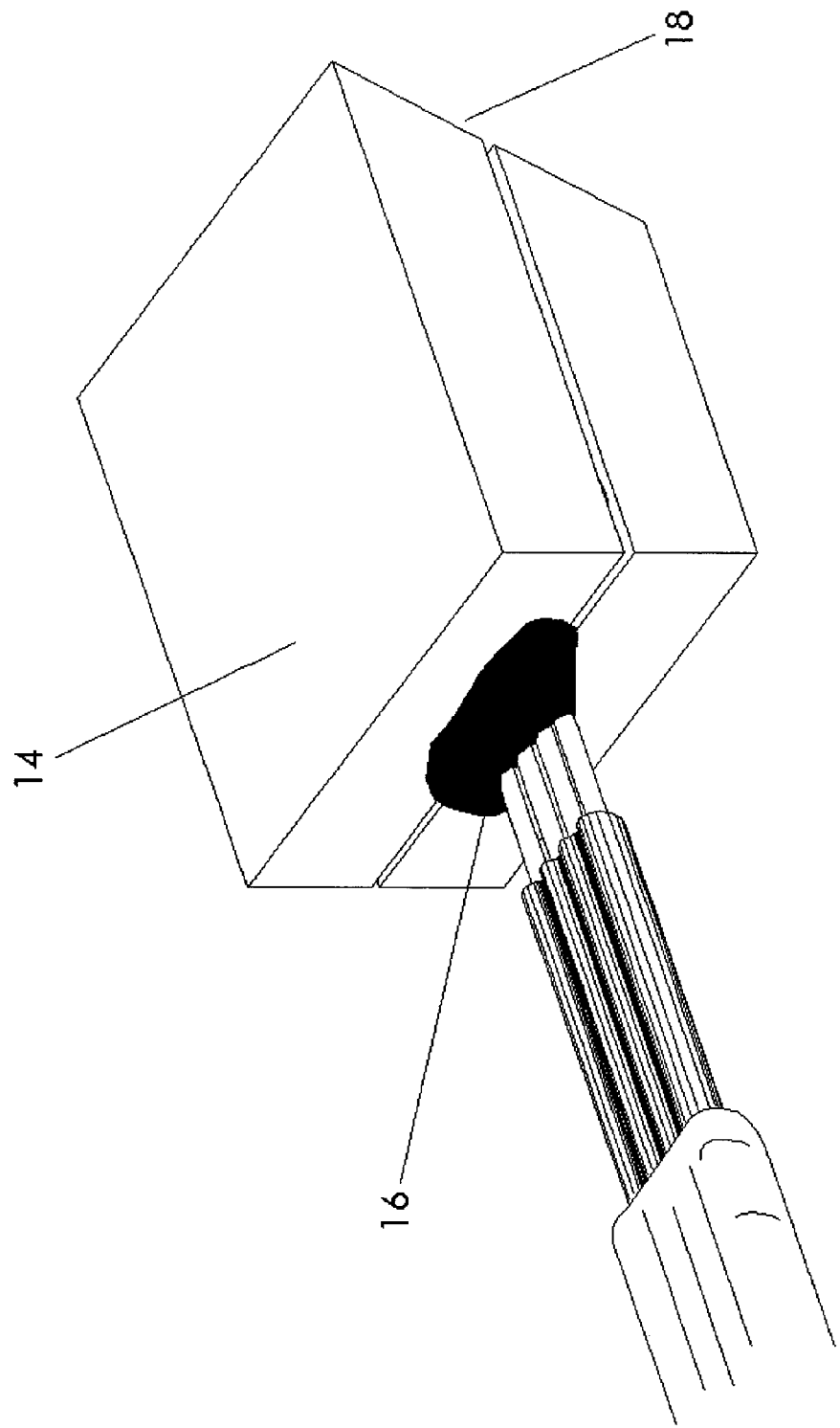
Figure 06a - Bevel (Perspective)

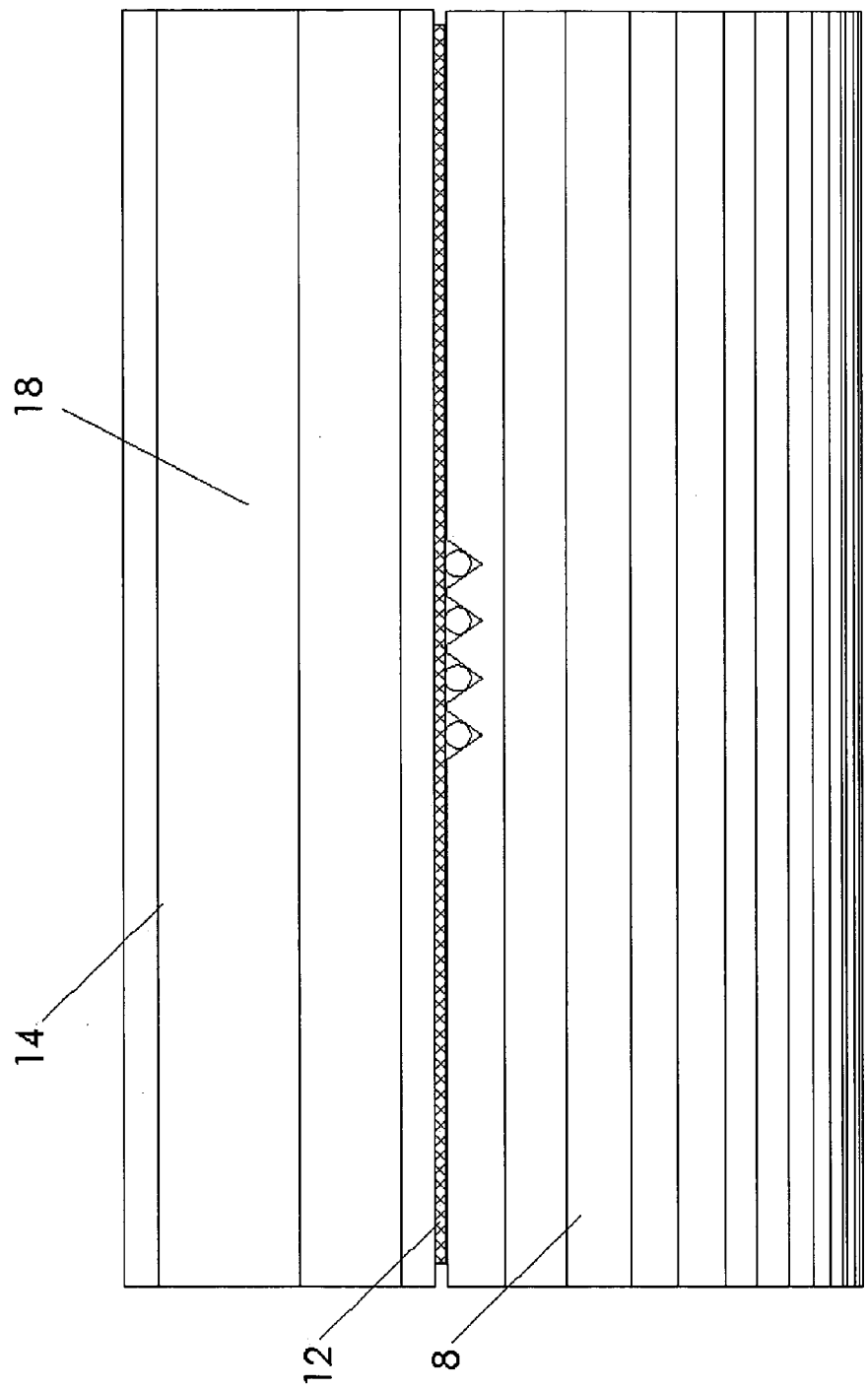
Figure 06b - Bevel (Front)

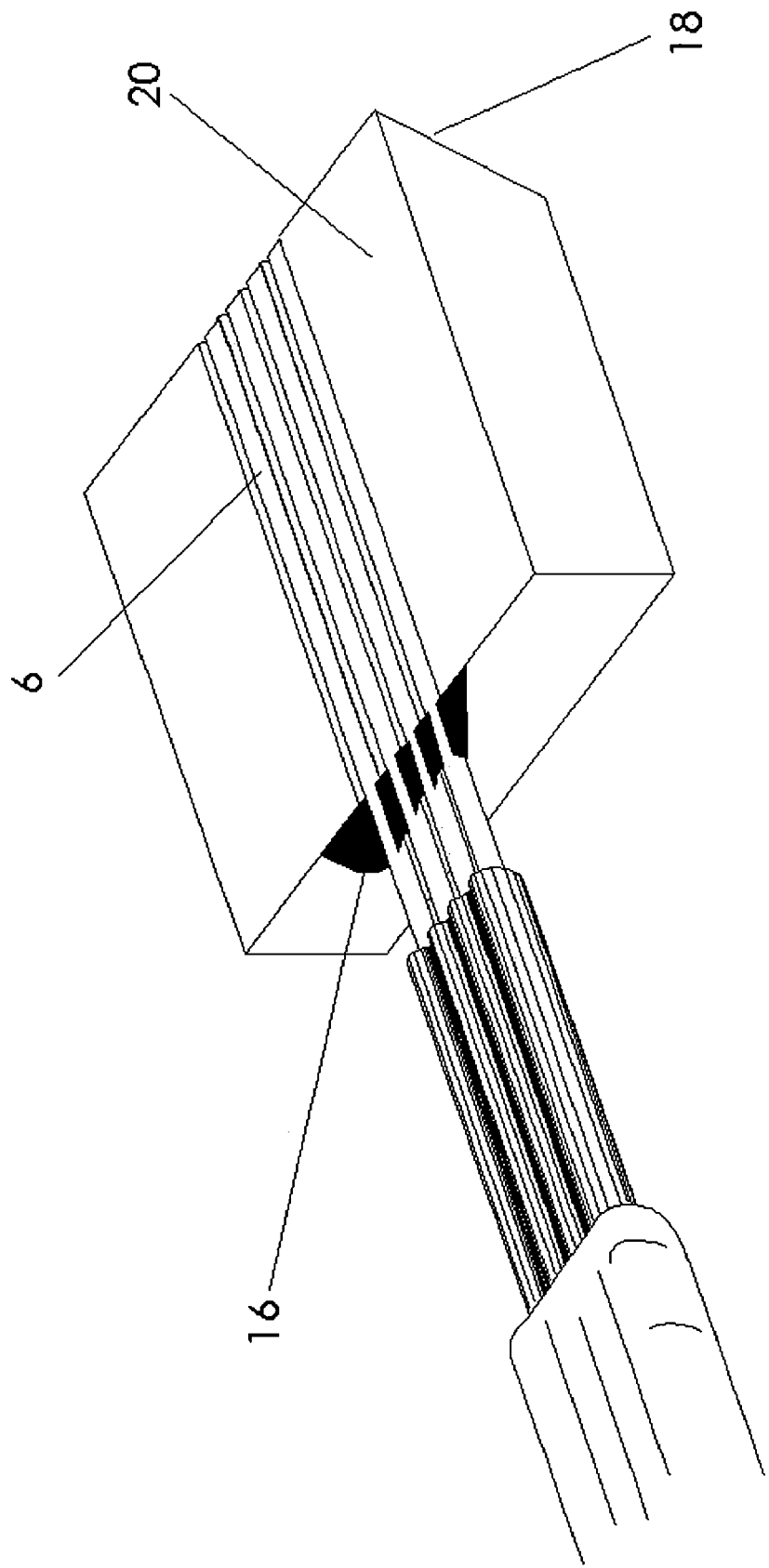
Figure 07a - Cover Plate Removal (Perspective)

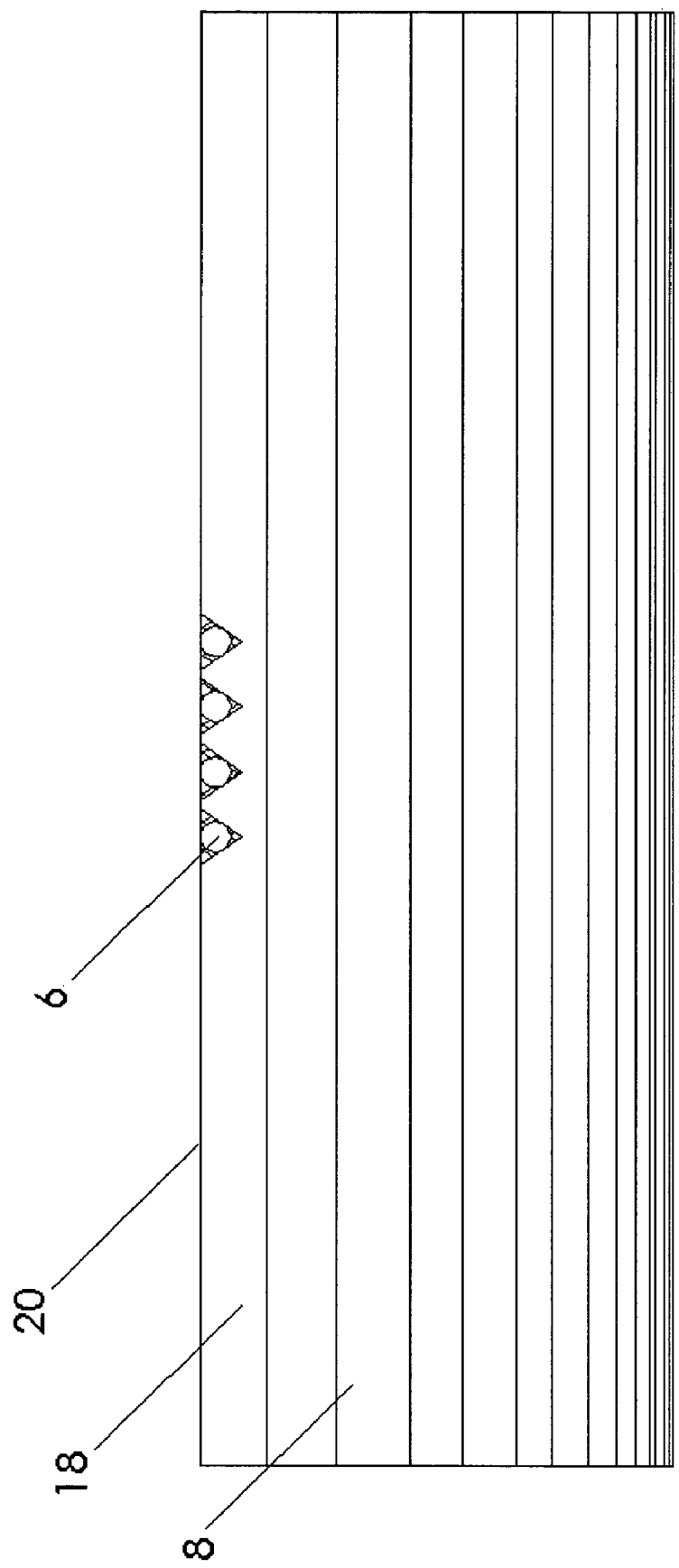
Figure 07b - Cover Plate Removal (Front)

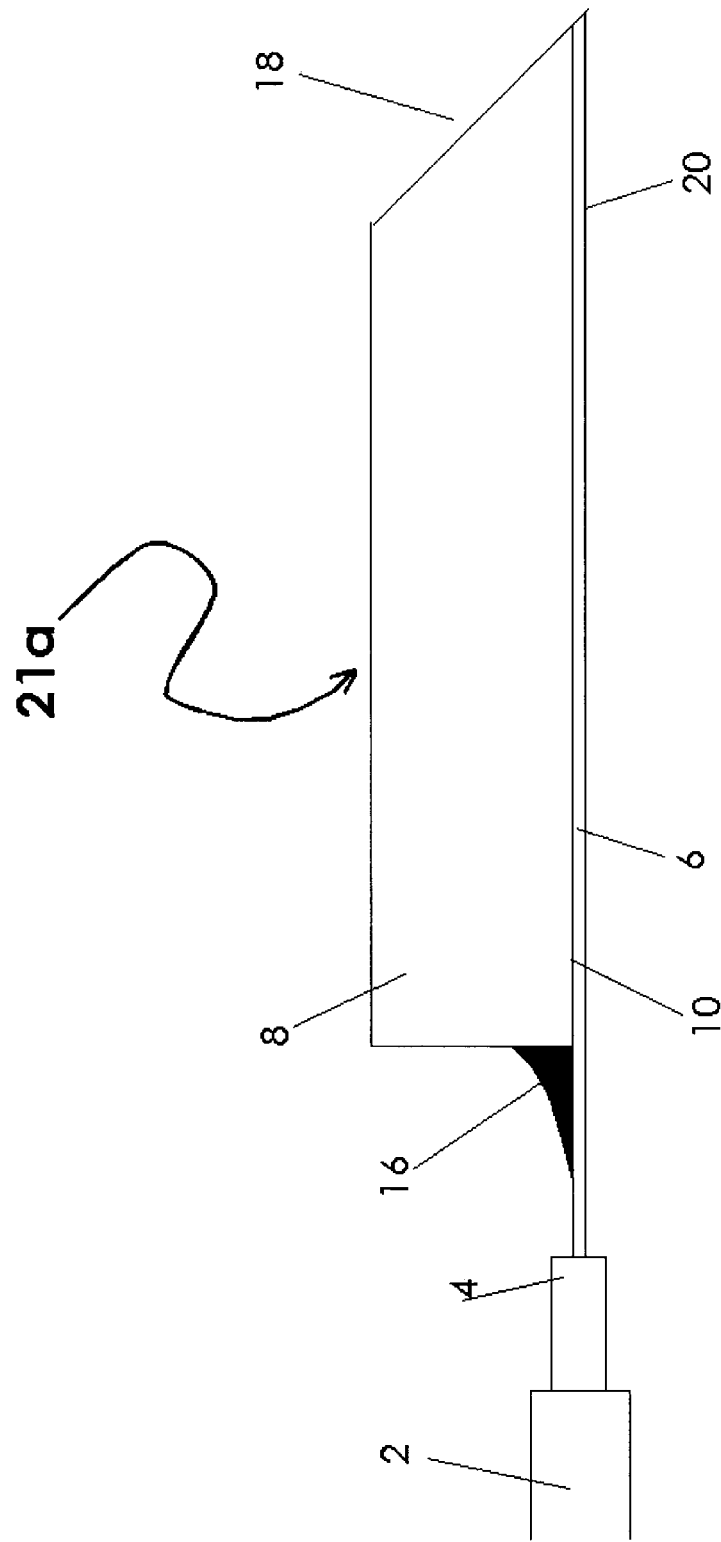
Figure 08 - Completed Connector (to Scale Side View)

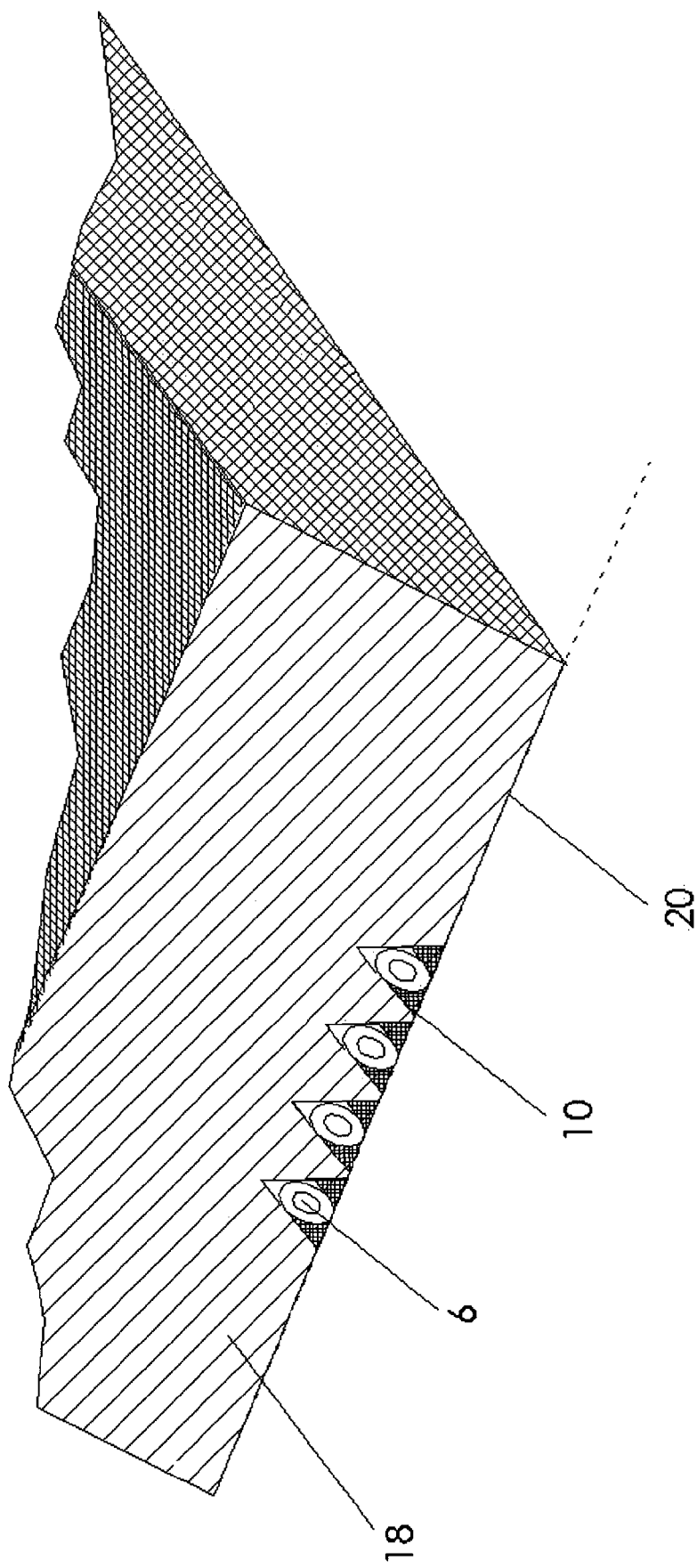
Figure 09a - Perfect Polish (Perspective of Front)

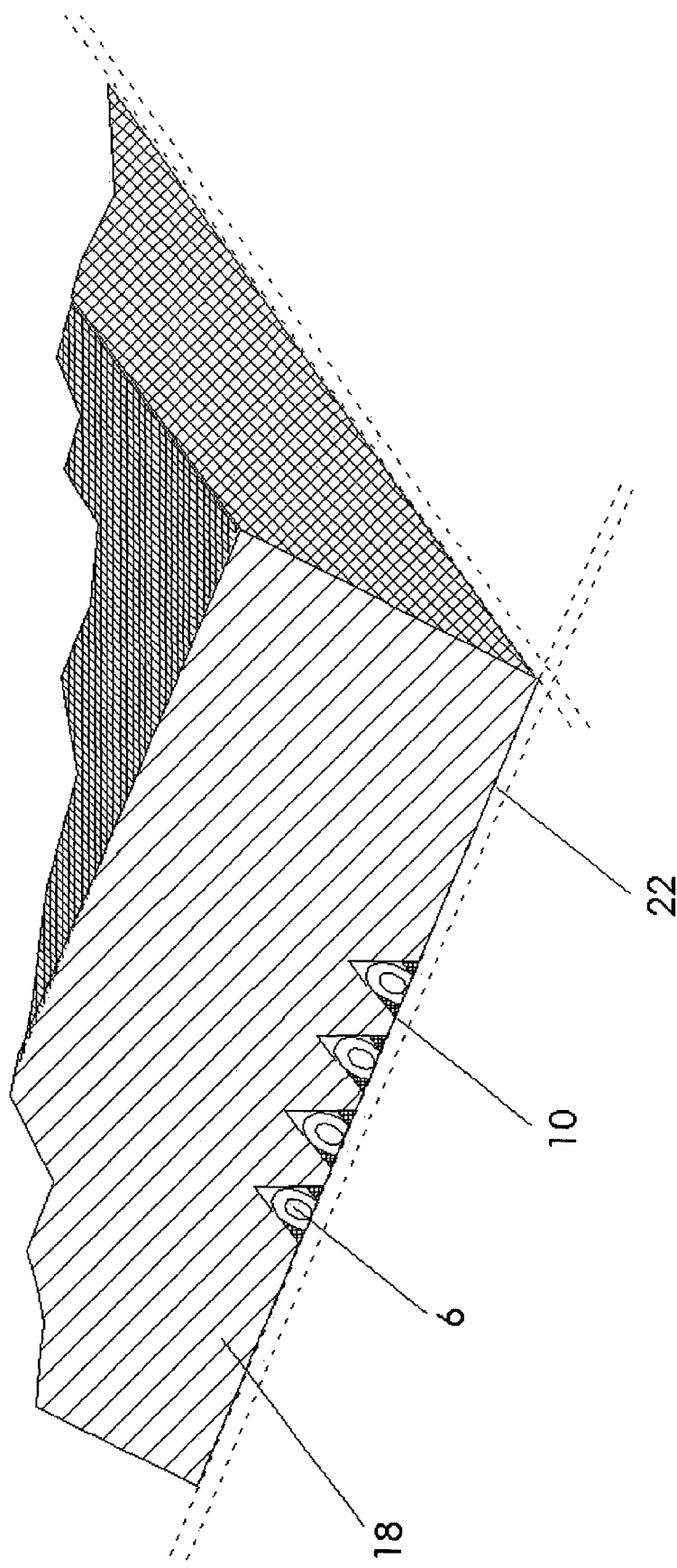
Figure 09b - Over Polished (Perspective of Front)

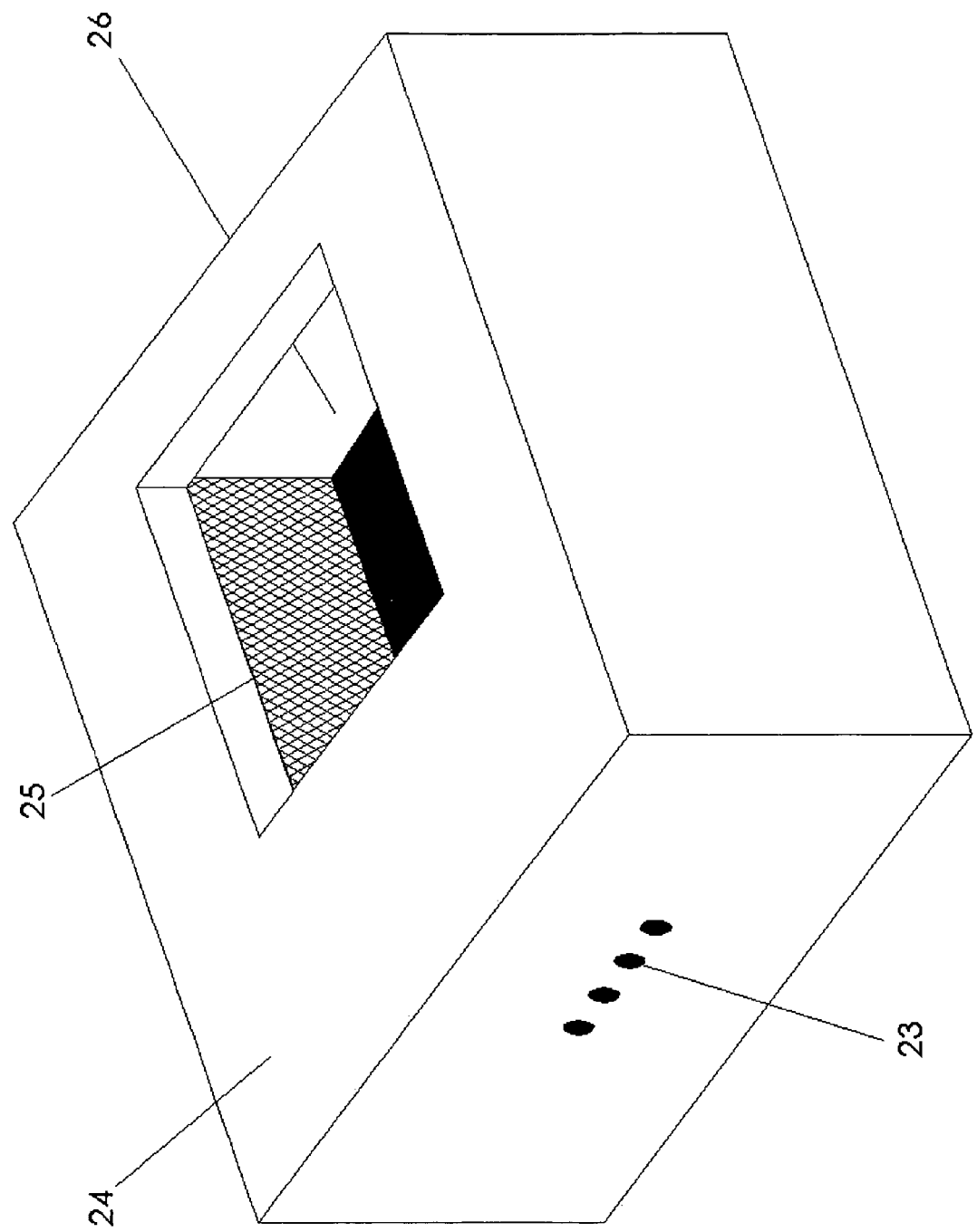
Figure 10a - Plastic Ferrule (Perspective)

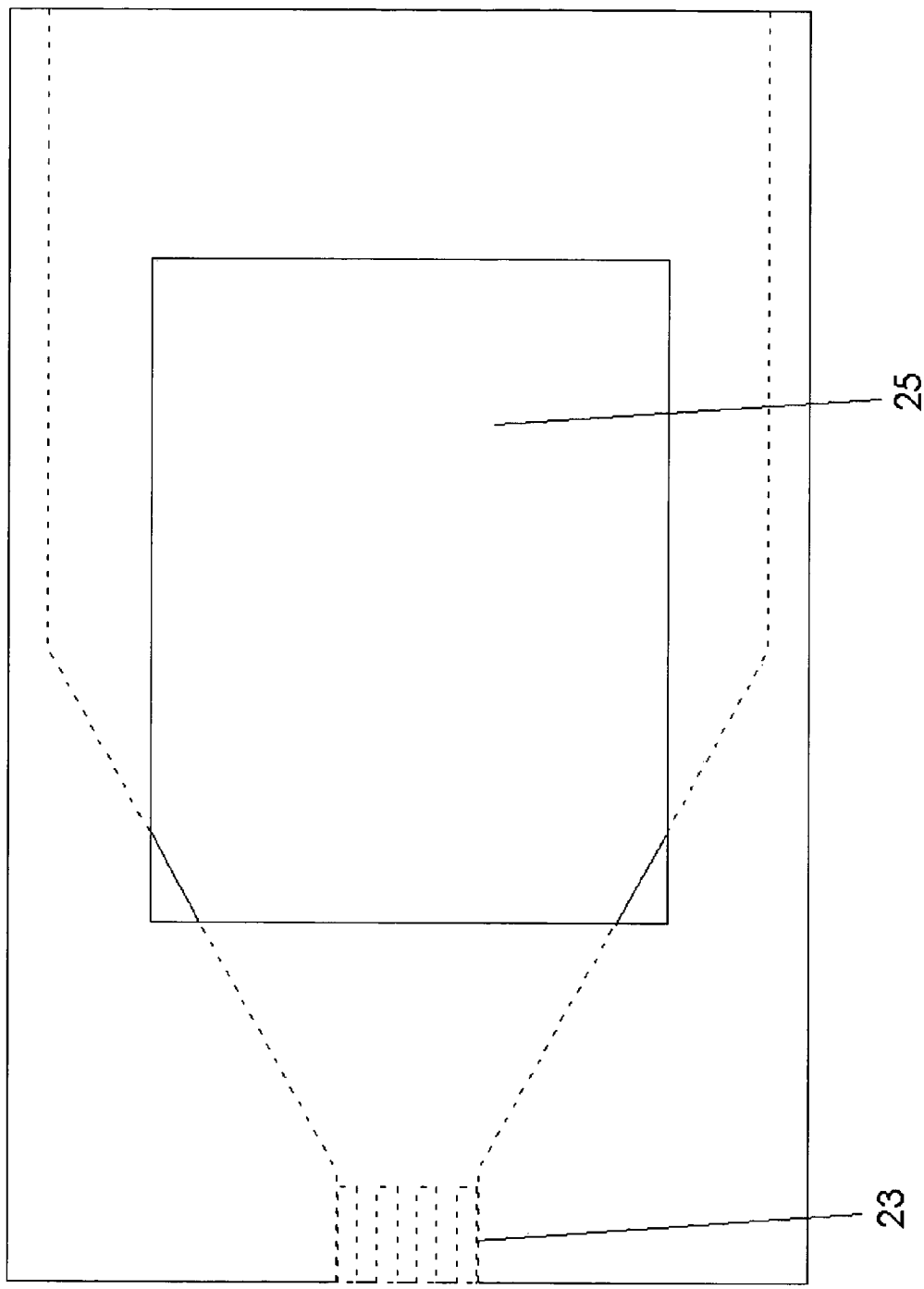
Figure 10b - Plastic Ferrule (Top)

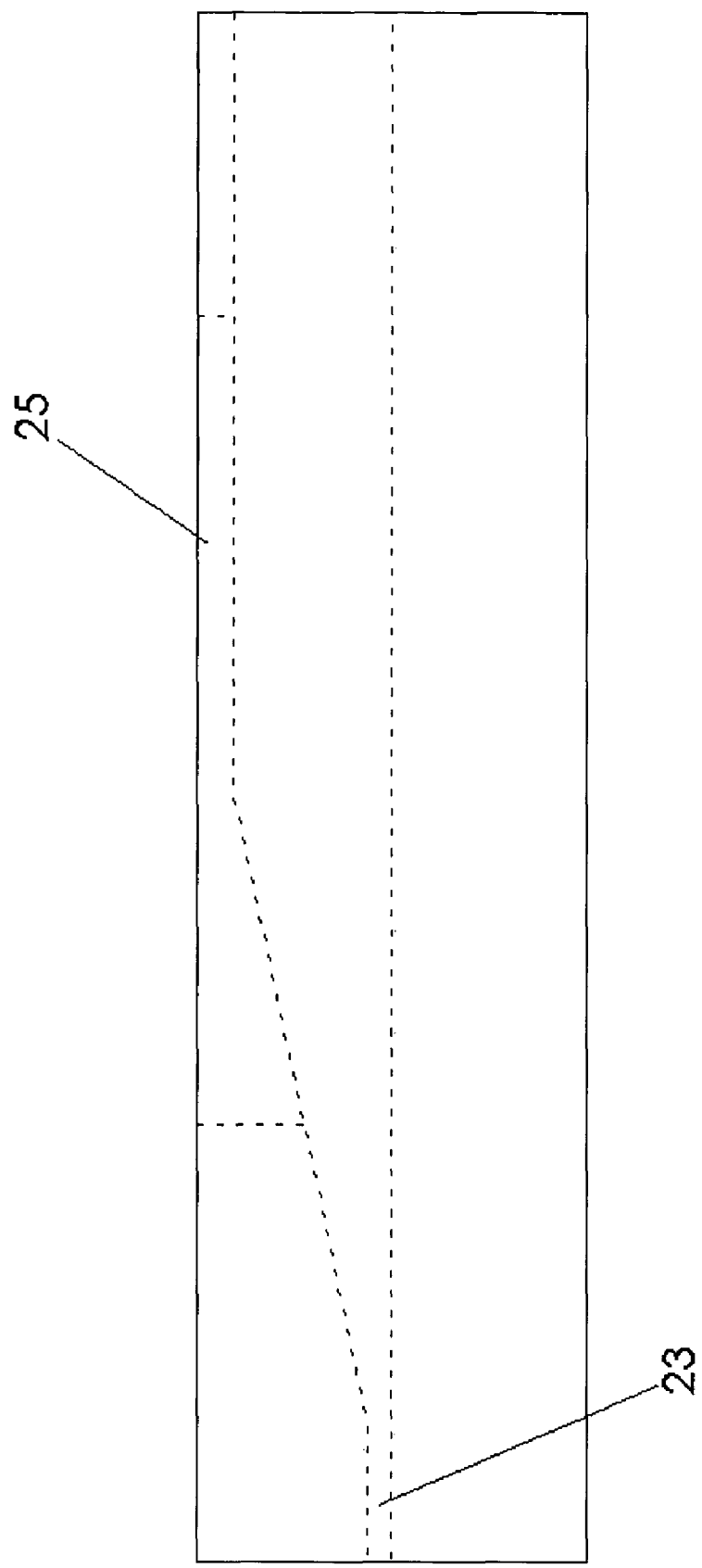
Figure 10c - Plastic Ferrule (Side)

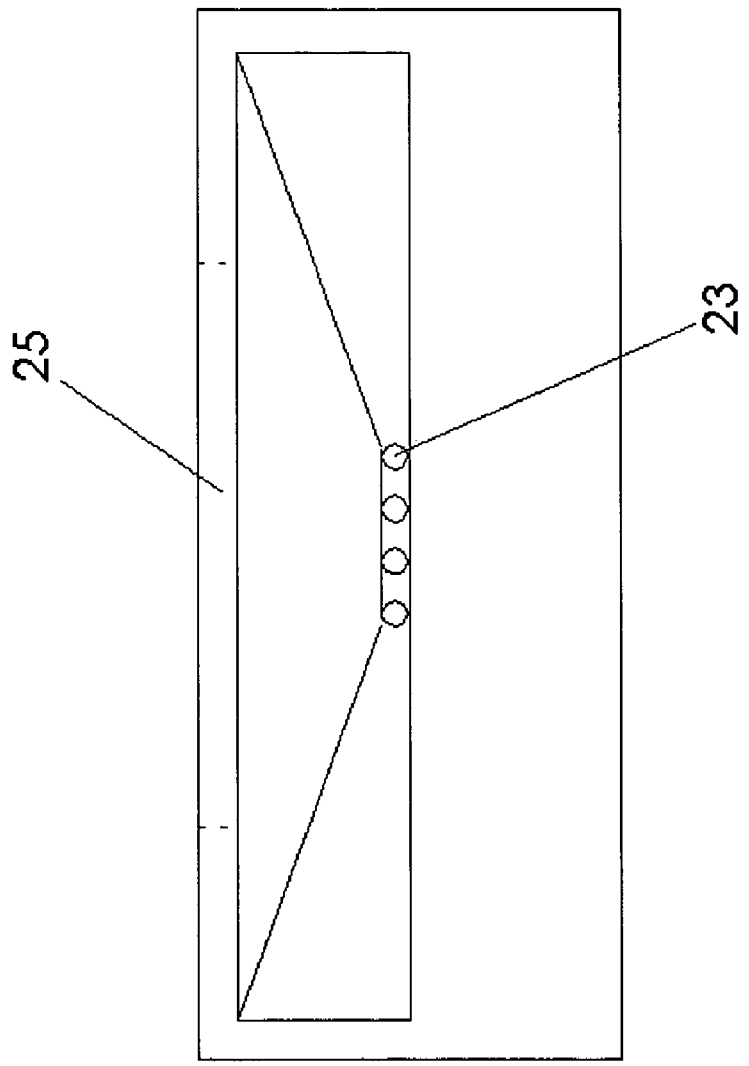
Figure 10d - Plastic Ferrule (Back)

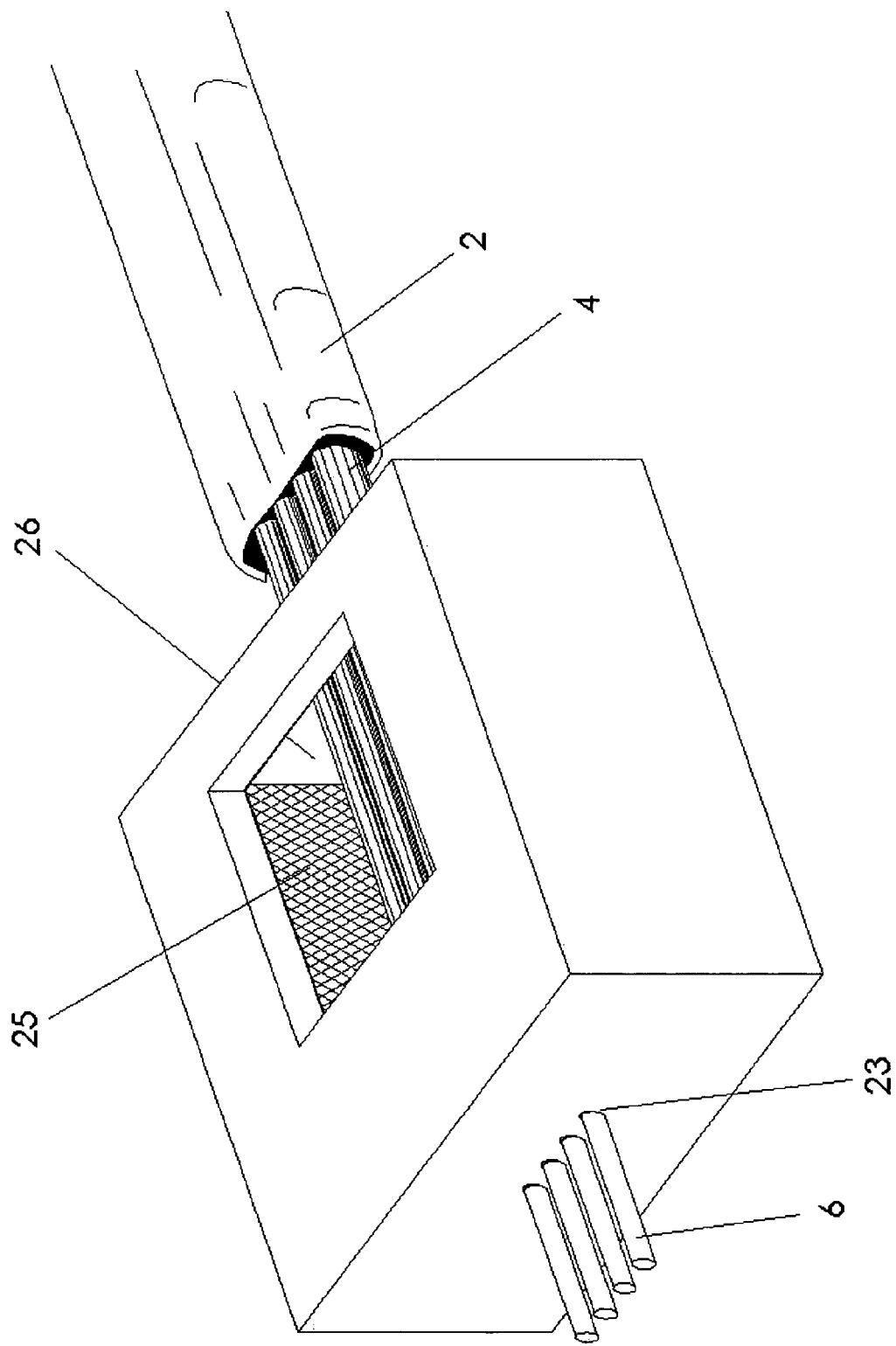
Figure 11 - Fibers in Ferrule (Perspective)

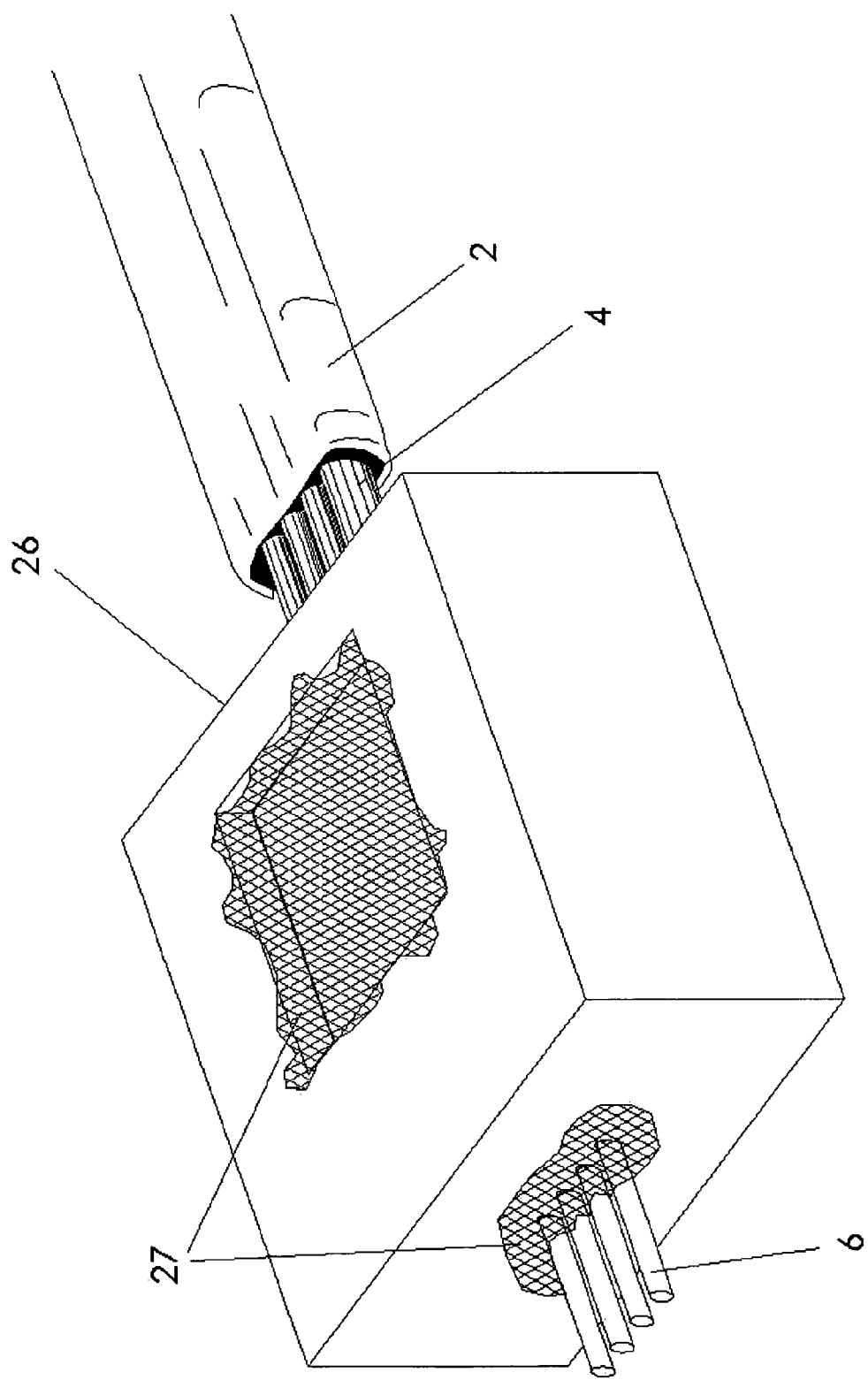
Figure 12 - Epoxy Filled Cavity (Perspective)

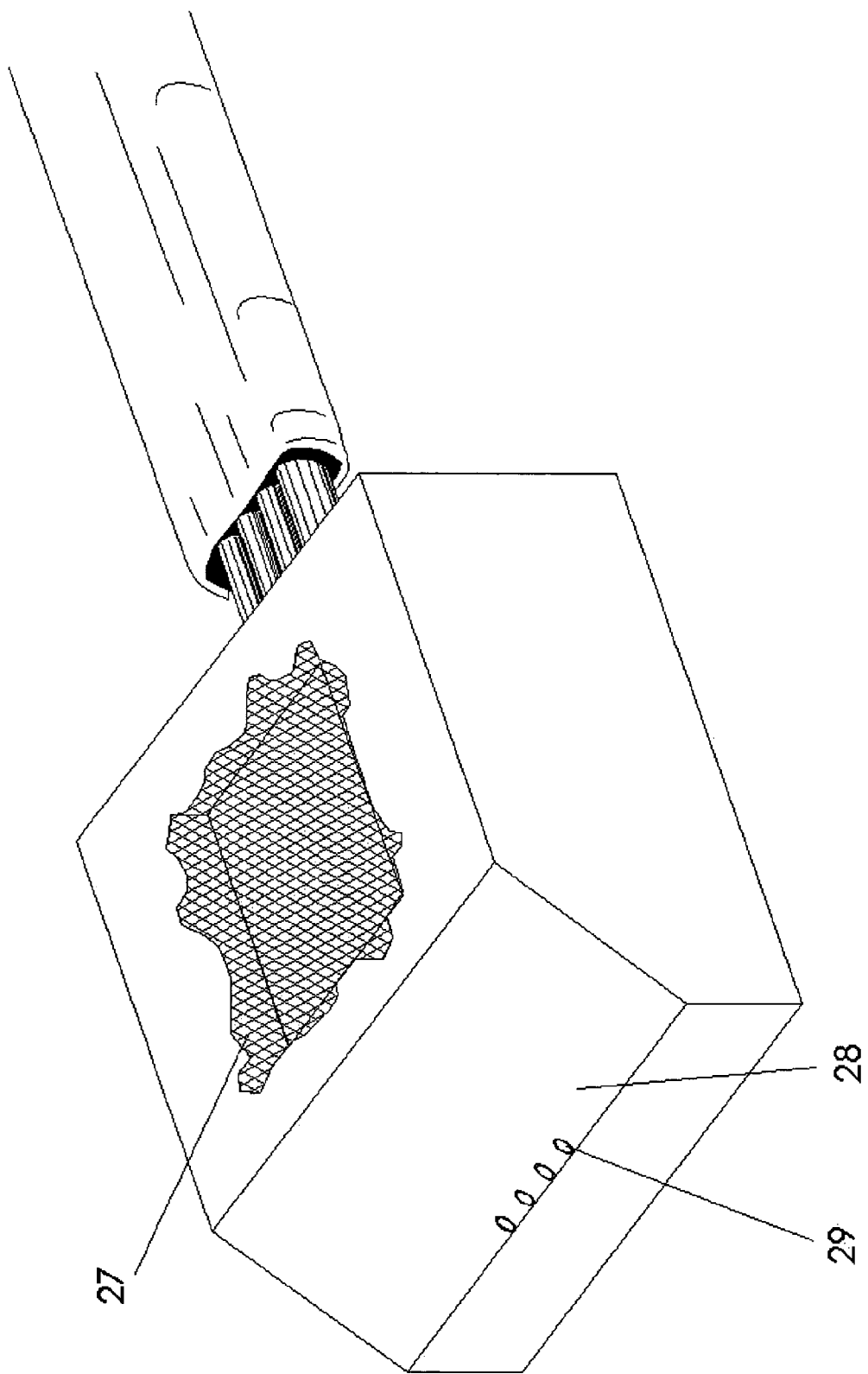
Figure 13 - Bevel (Perspective)

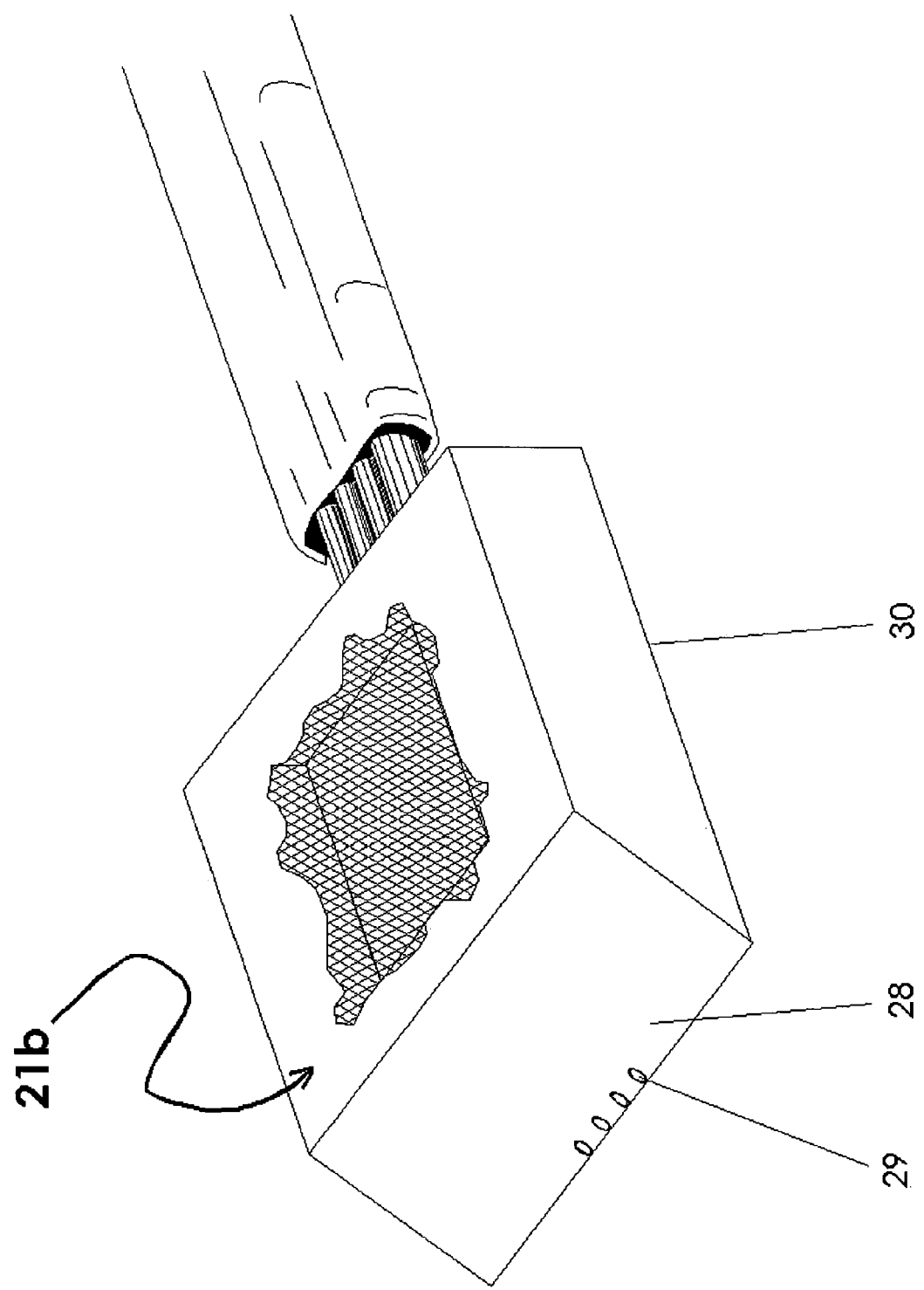
Figure 14 - Flat Polished (Perspective)

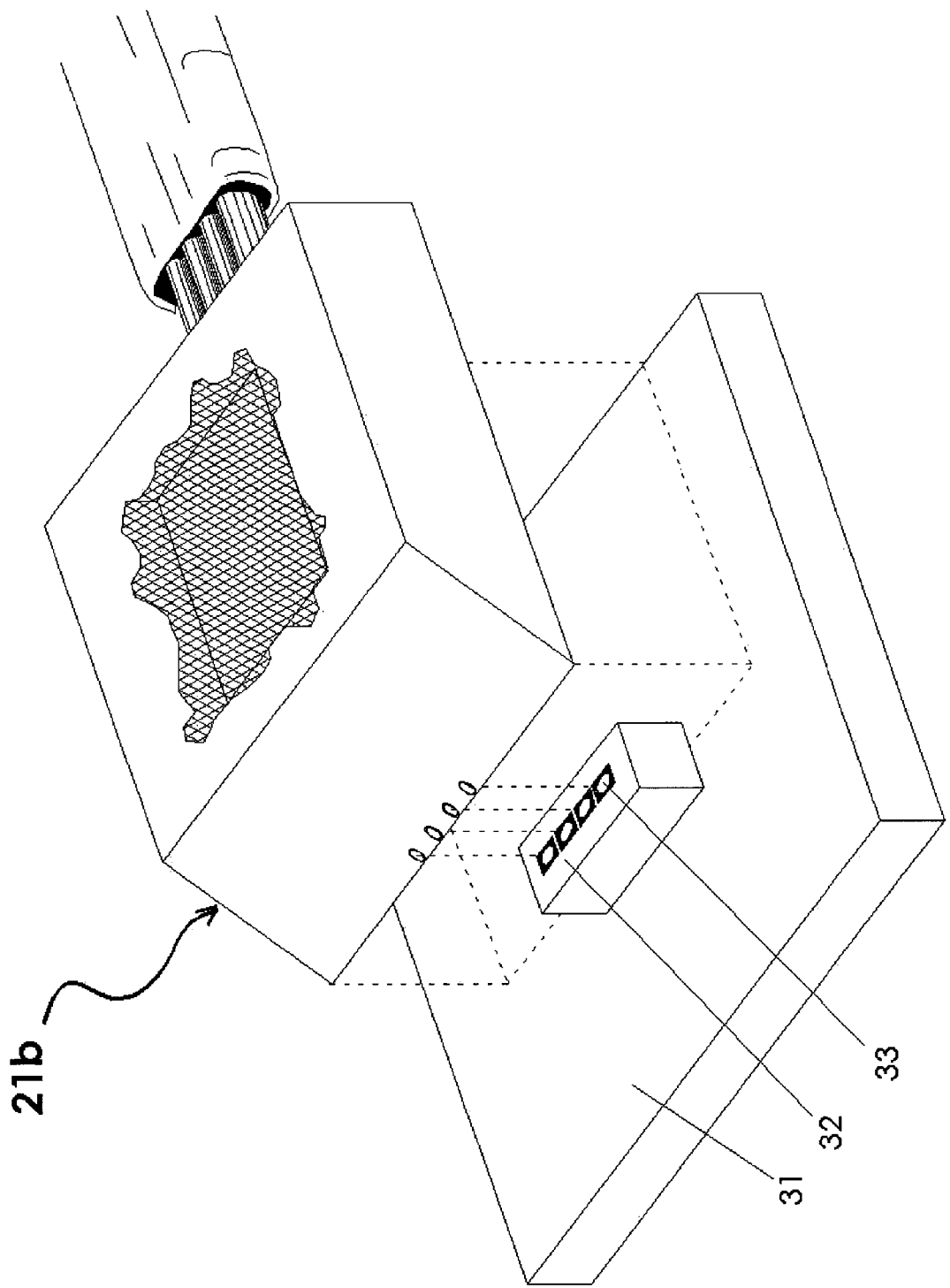
Figure 15 - Connector Over Optoelectronic (Perspective)

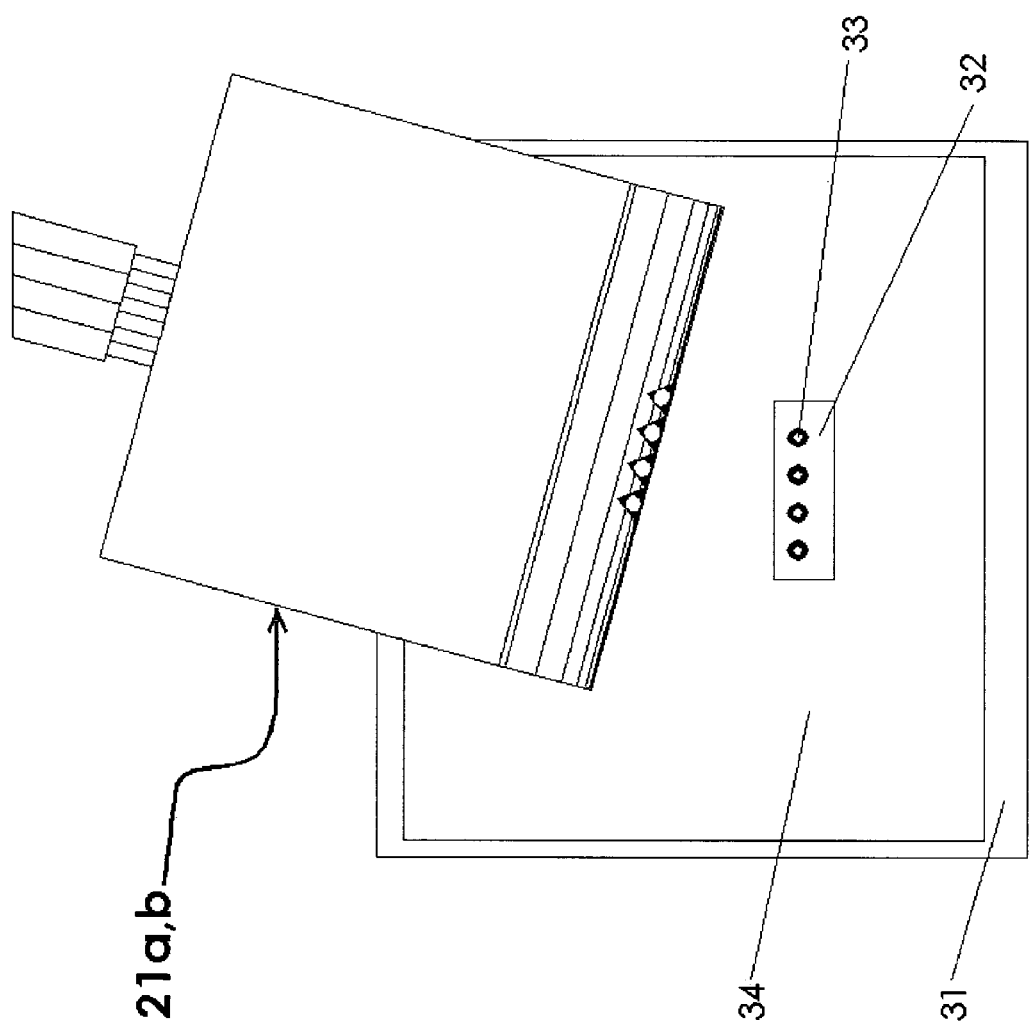
Figure 16a - Alignment Step 1 (Top)

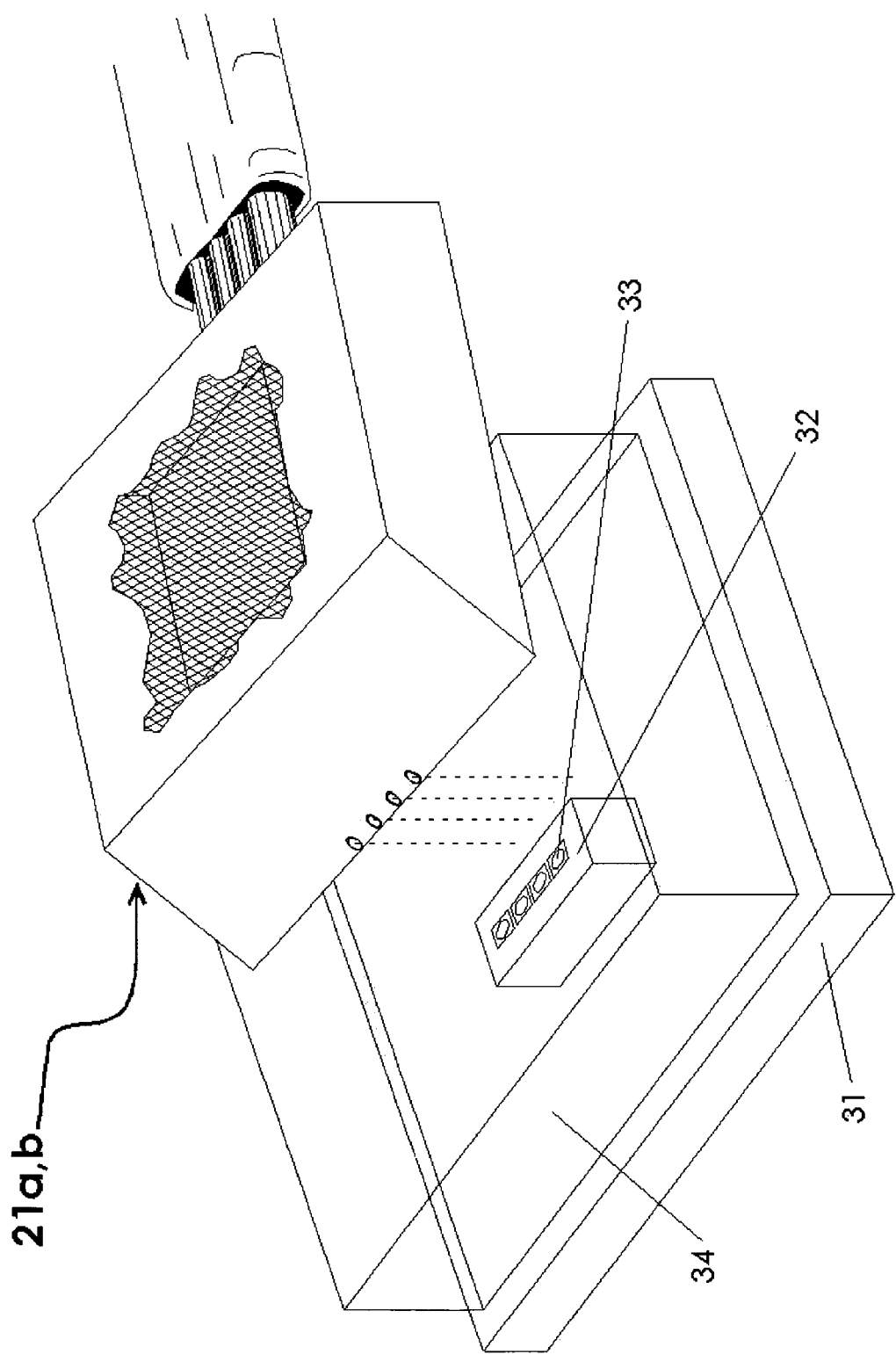
Figure 16b - Alignment Step 1 (Perspective)

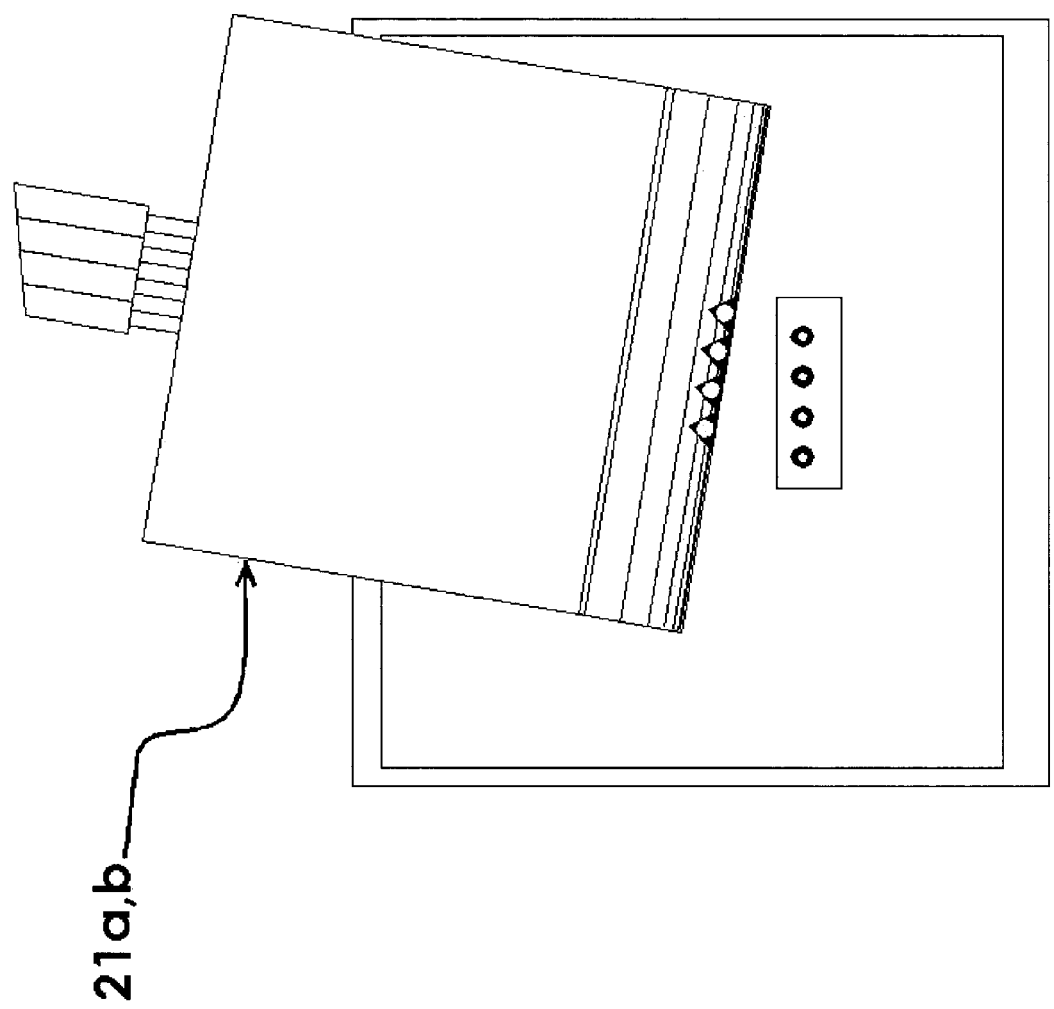
Figure 17a - Alignment Step 2 (Top)

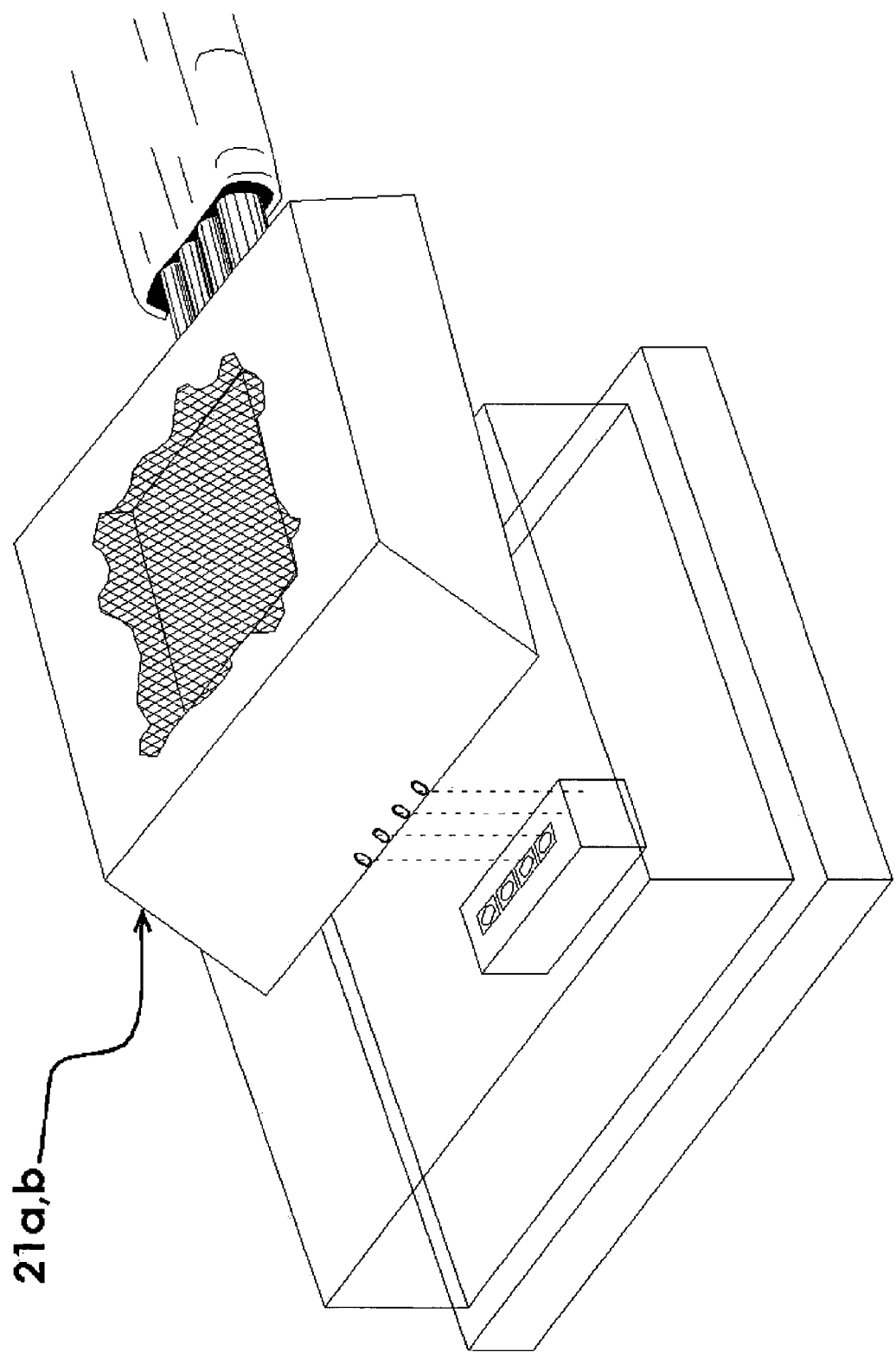
Figure 17b - Alignment Step 2 (Perspective)

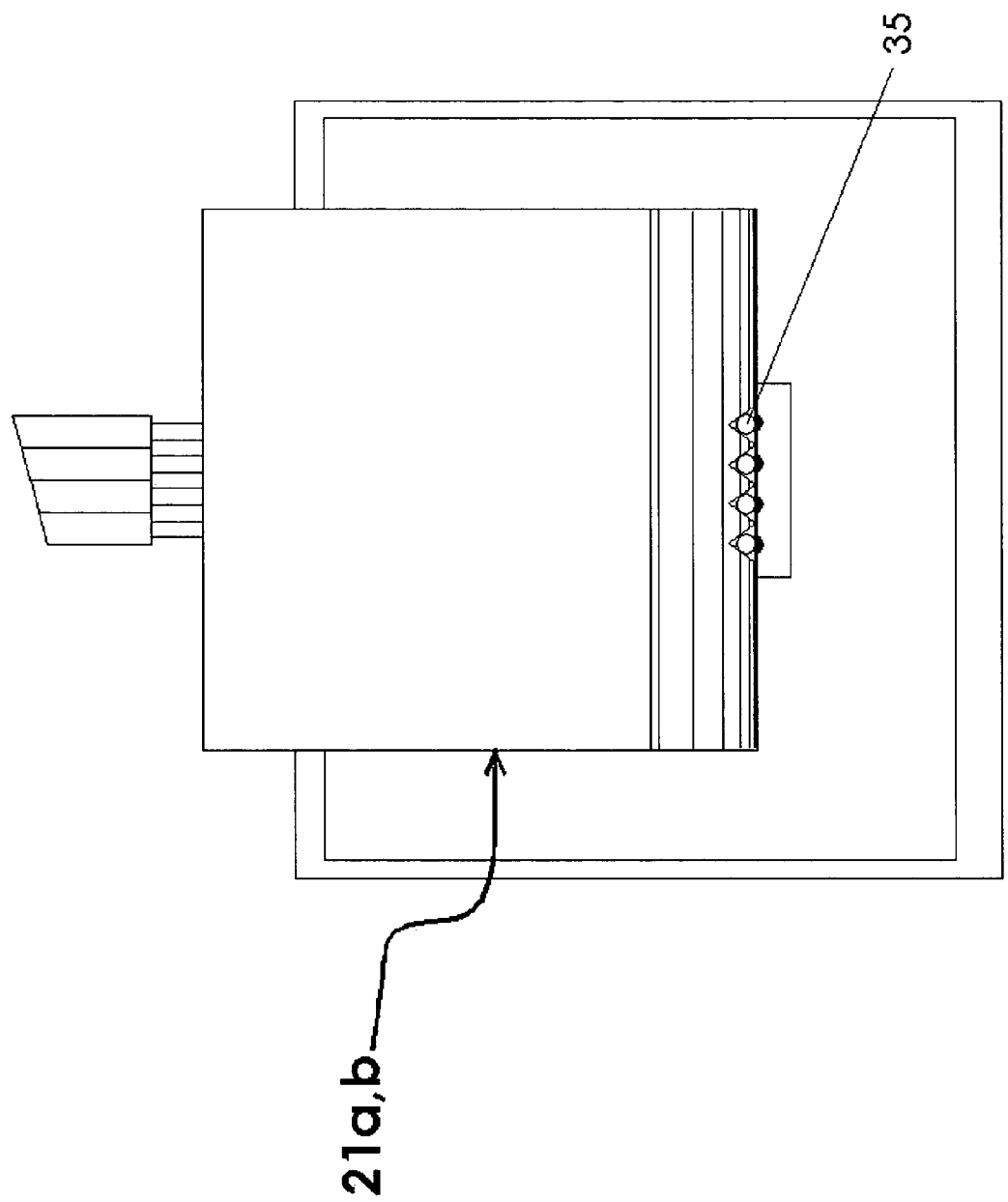
Figure 18a - Alignment Step 3 - Aligned (Top)

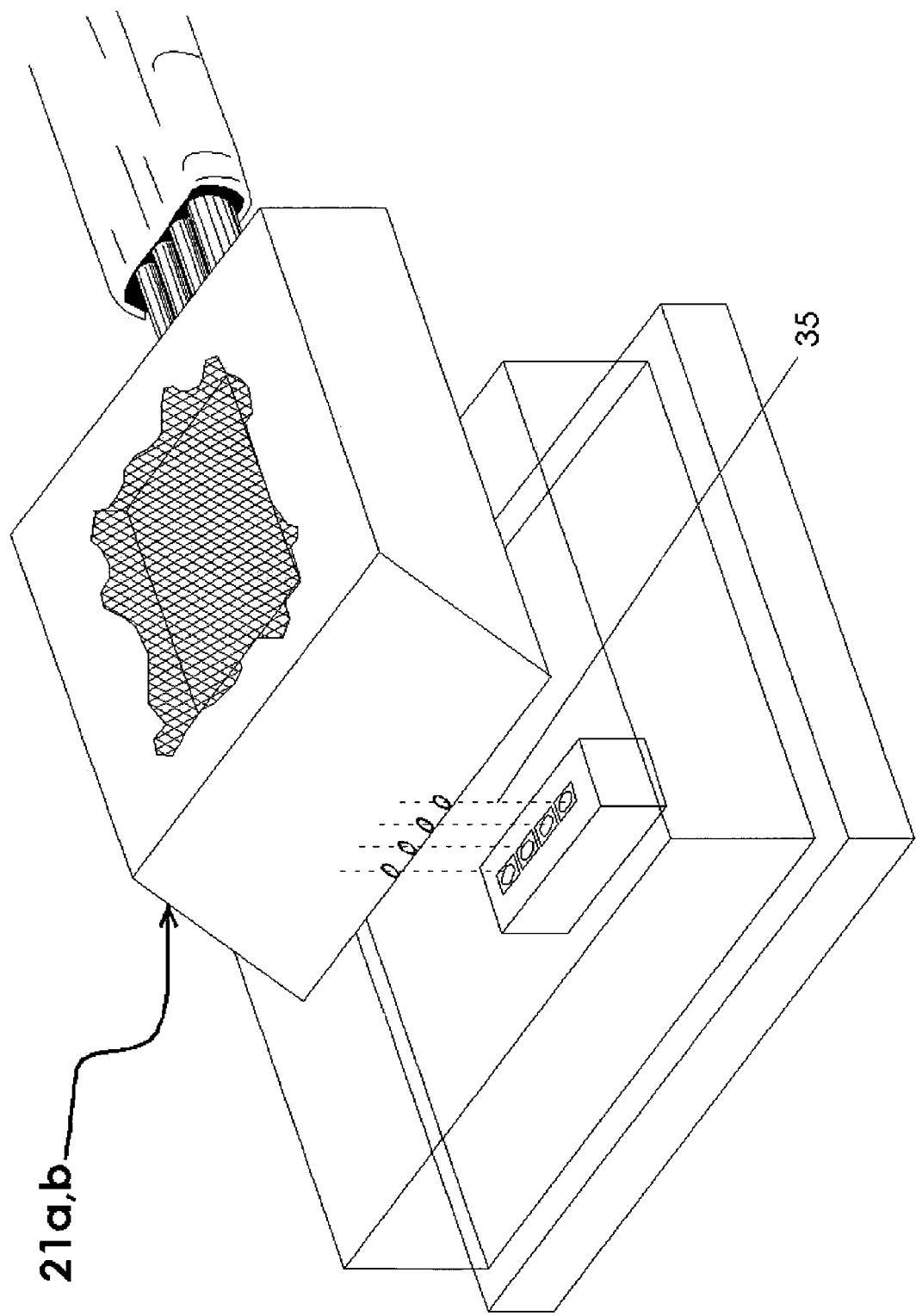
Figure 18b - Alignment Step 3 - Aligned (Perspective)

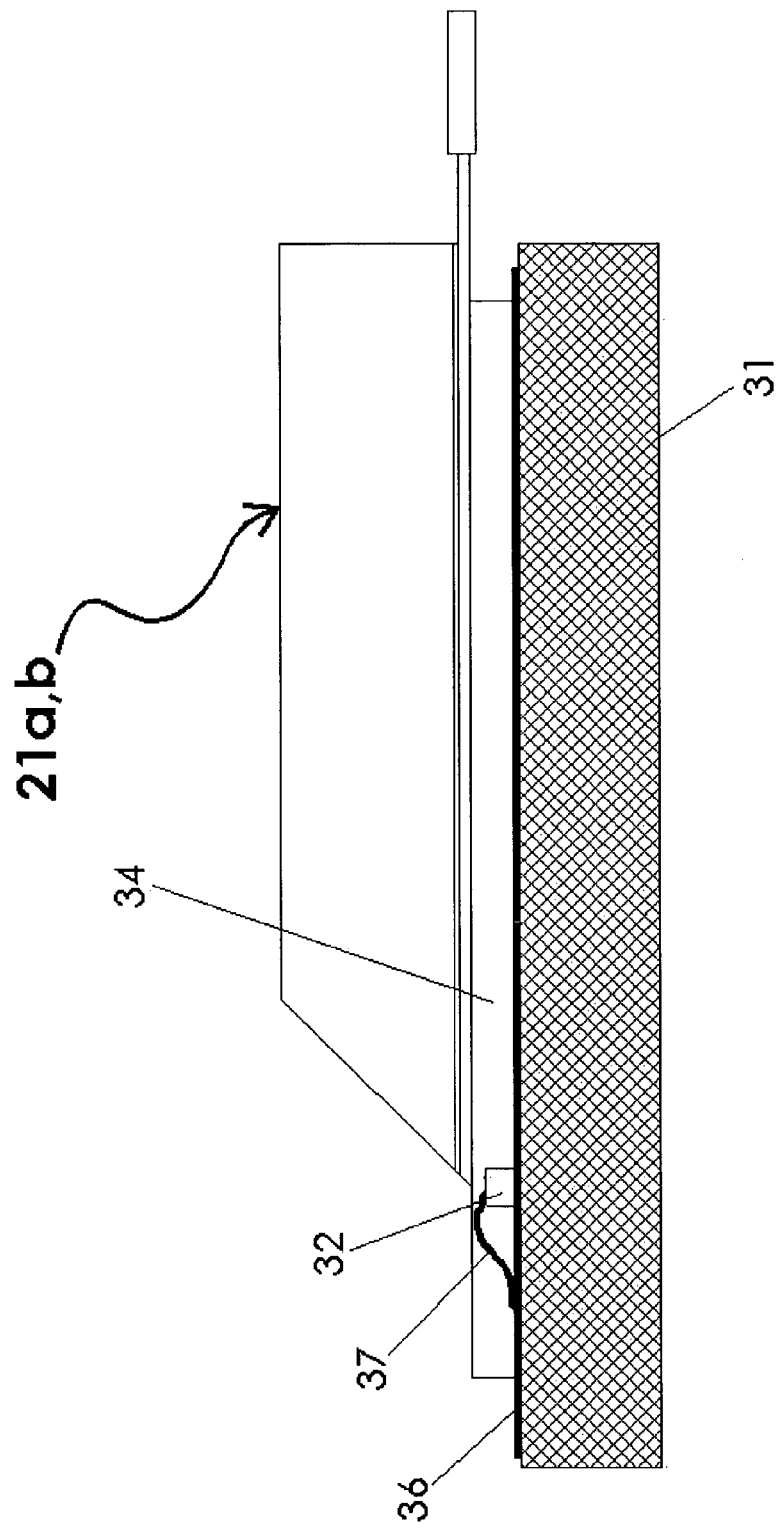
Figure 19 - Aligned Connector Over Optoelectronic (To Scale Side View)

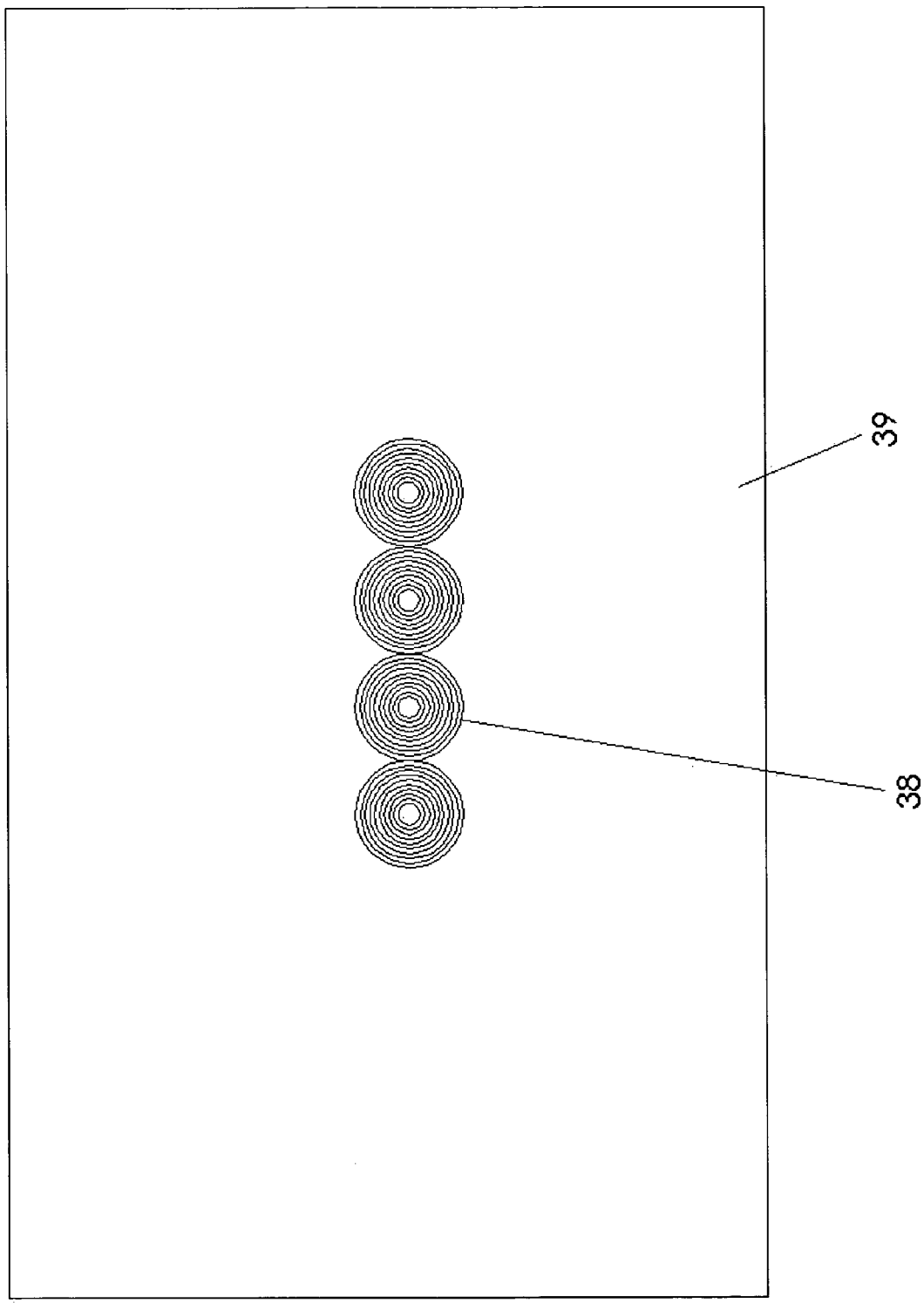
Figure 20 - Microlens Array on Glass Substrate (Top)

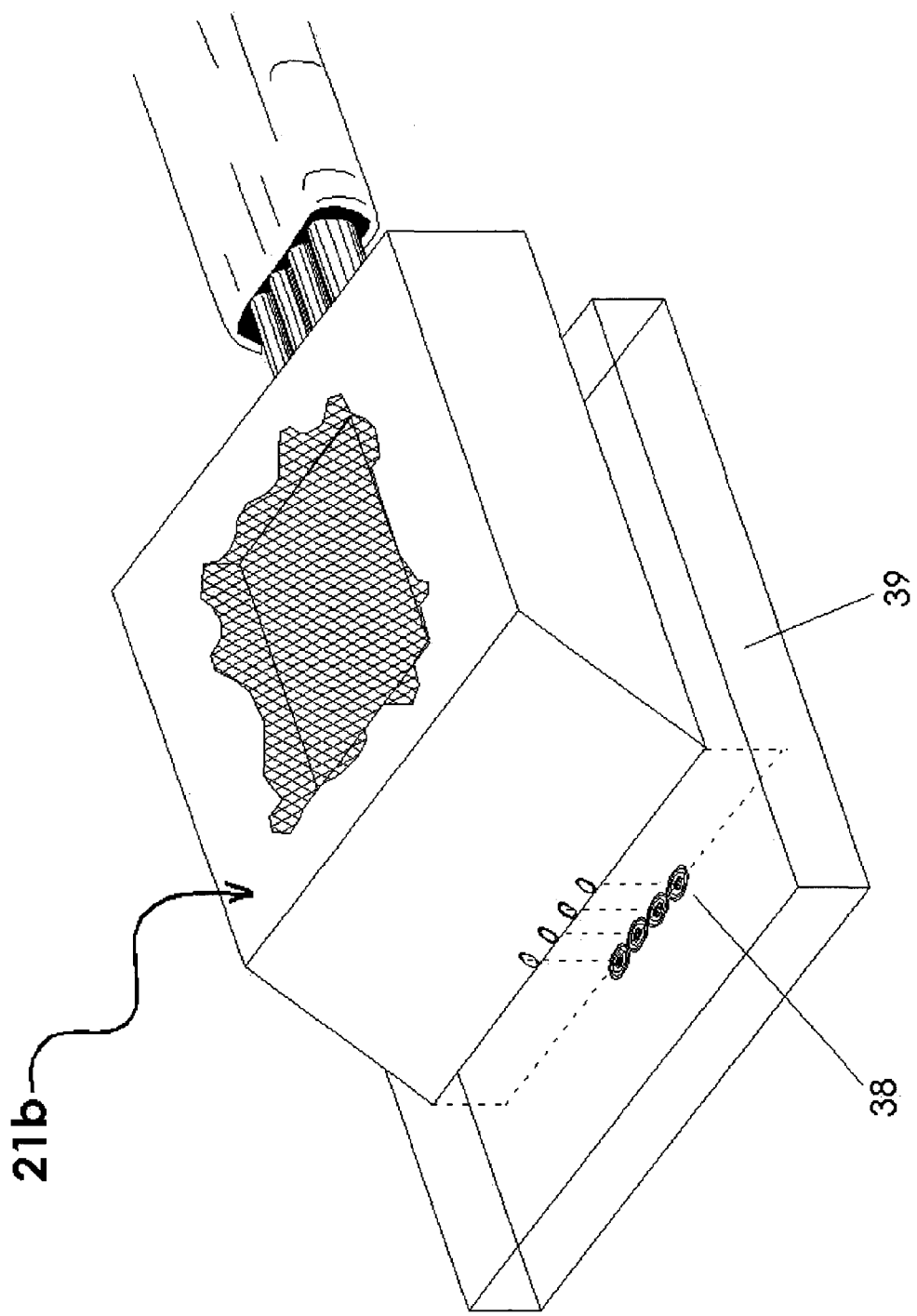
Figure 21 - Connector Over Microlenses (Perspective)

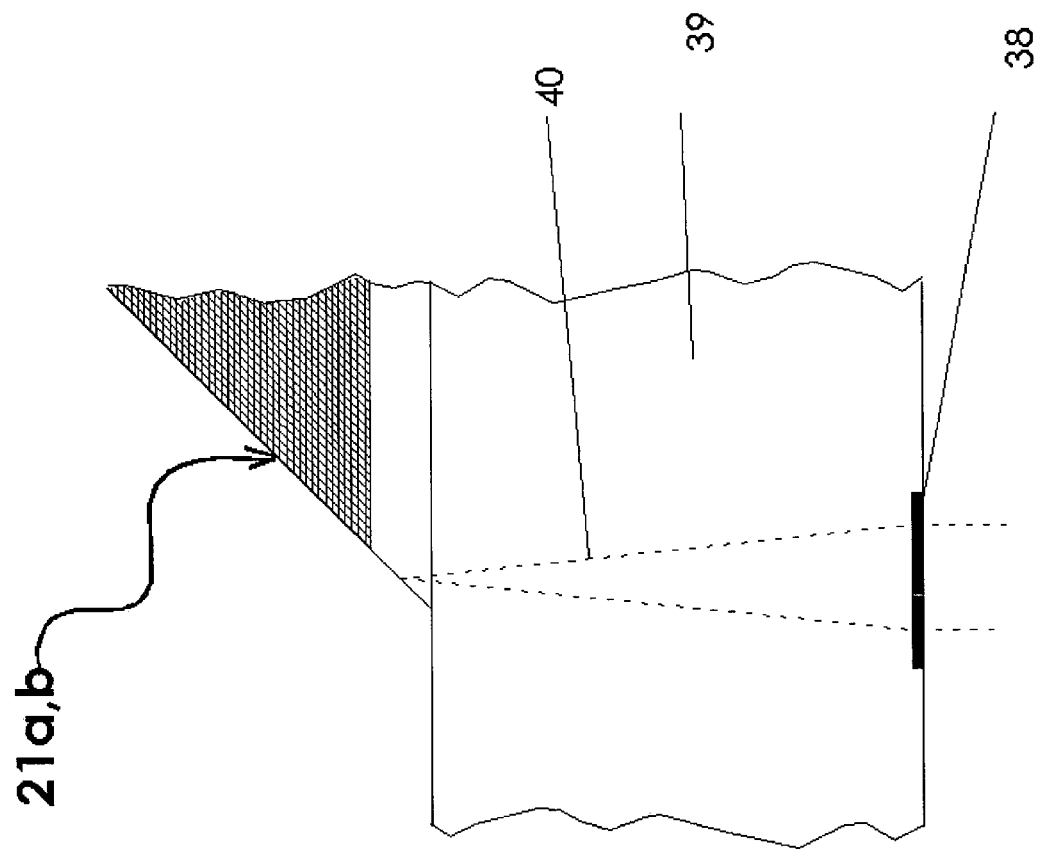
Figure 22a - Aligned Connector Over Microlens (Zoom-In Side View)

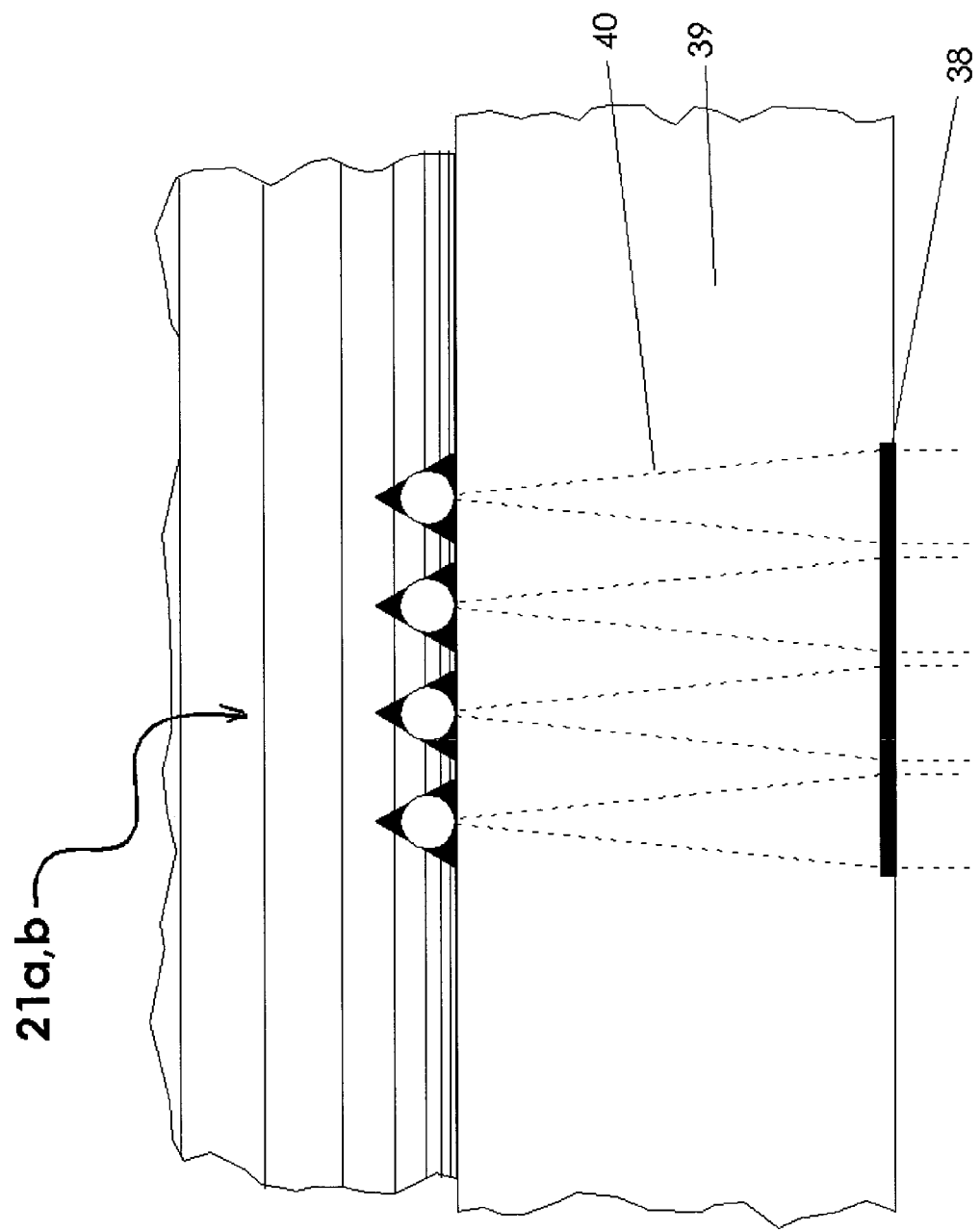
Figure 22b - Aligned Connector Over Microlens (Zoom-In Front View)

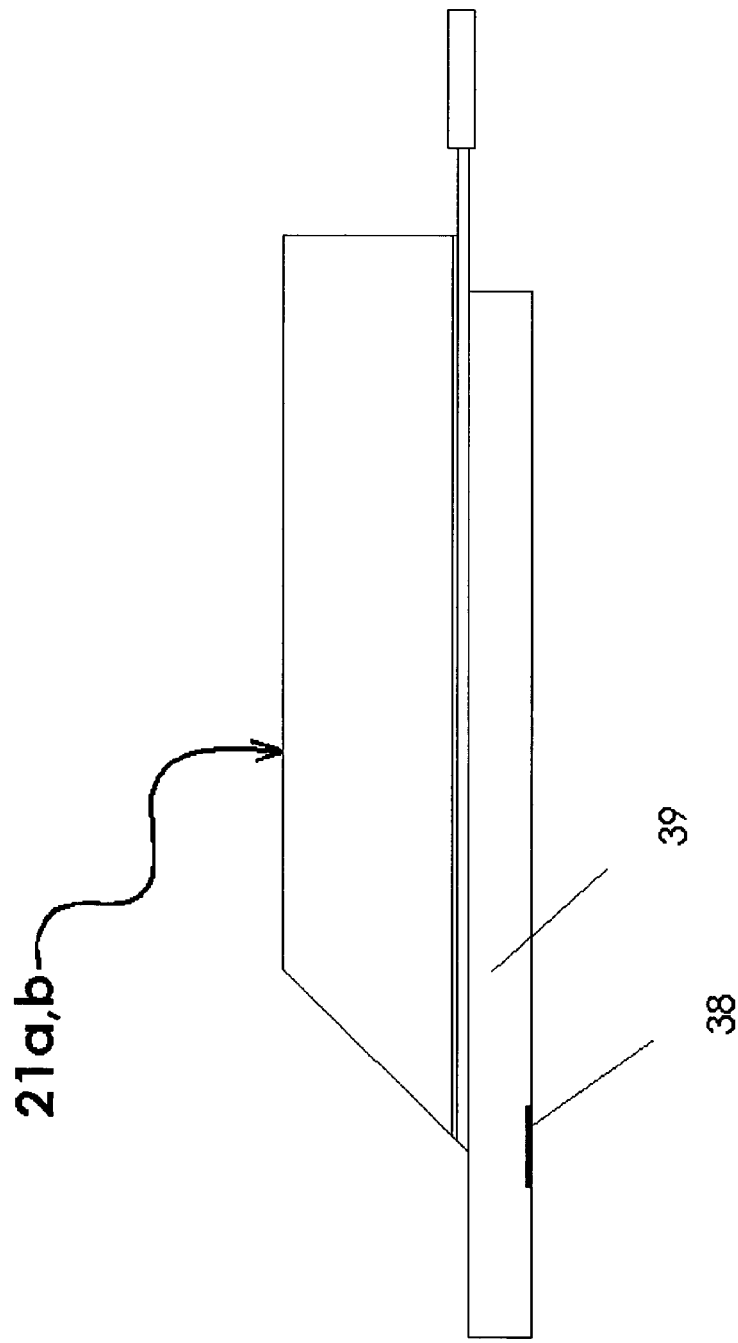
Figure 23 - Aligned Connector Over Microlens (To Scale Side View)

OPTICAL CONNECTOR ASSEMBLY

CROSS-REFERENCE TO RELATED APPLICATIONS

This is the first application filed for the present invention. This application is related to commonly assigned co-pending applications filed herewith Ser. No. 10/625,901 entitled "Optical Ferrule" and Ser. No. 10/625,906 entitled "Encapsulated Optical Package", the specifications of which are hereby incorporated by reference.

TECHNICAL FIELD

This invention relates to the field of optical connecting devices. More precisely, this invention relates to methods and apparatus for connecting optical fibers to optoelectronic devices.

BACKGROUND OF THE INVENTION

The optical coupling of light emitted, absorbed or altered by optoelectronic (OE) devices, such as photodetectors, light emitting diodes (LED's), lasers, and vertical cavity surface emitting lasers (VCSEL), with optical waveguides, such as optical fibers and planar waveguides, is well known in conventional photonics. One technique that is known involves cutting an optical fiber at a 45 degree bevel so that light is exchanged between the fiber and an OE device at a side of the fiber. The bevel surface may be coated to be more reflective, or it may be left exposed so as to reflect light by total internal reflection (TIR).

The cost of manufacturing such waveguide-to-device couplings is determined by the ease of preparing the both the waveguide (e.g. fiber) and the OE device for the step of coupling, and then performing the coupling itself in a manner that ensures an efficient transfer of optical signal without introduction of noise.

An optoelectronic chip, containing a device such as a vertical cavity surface emitting laser (VCSEL), is typically mounted in an electronic package where the direction of the light from the VCSEL is perpendicular (normal) to the surface of both the chip itself and the surface on which the electronic package has been placed. Electronic packages are typically placed on large 2-D flat printed circuit boards (PCBs), and these PCBs are typically stacked within a chassis with very narrow gaps between the PCBs. This type structure requires that all the connections to and from the PCB enters and leaves from the PCB's edge, called the card-edge. Since the light from the VCSEL is emitted perpendicular to the PCB, a method is required to direct the light off the edge of the PCB, and hence parallel to the flat surface of the PCB. The typical method used to achieve card-edge connections with light is to use a flexible-PCB bent at 90-degrees where one face of the flexible-PCB connects to the main PCB and the other face has the optoelectronic chip where the light from the VCSEL is directed parallel to the surface of the main PCB. The light is then butt-coupled into an optical fiber.

The bevel coupling method allows the optoelectronic chip to be placed in the conventional packages where the light is directed perpendicular to the PCB. The optical fiber is then beveled at 45-degrees and placed over the light beam such that the light is reflected at 90-degrees and propagates parallel to the PCB within the optical fiber. This method allows more conventional packaging and reduces the alignment tolerance because the length of the optical fiber is essentially laid over the flat surface of the PCB.

Several patents use 45-degree beveled optical fiber as the core of their assemblies as well. U.S. Pat. No. 4,092,061 granted May 30, 1978, U.S. Pat. No. 6,250,820 granted Jan. 26, 2001, U.S. Pat. No. 6,315,464 granted Nov. 13, 2001 and U.S. Pat. No. 6,389,202 granted May 14, 2002 all describe assemblies that have beveled optical fiber tips located over (or under) optoelectronic devices. The alignment procedures for these types of assemblies are complicated. These methods typically involve micro-solder ball re-flow, flip-chip alignment and/or precisely machined parts, which require significant resources and materials.

The concept of creating a completely integrated assembly that holds both the optoelectronic devices and the waveguides has also been proposed in U.S. Pat. No. 4,611,886 granted Sep. 16, 1986. It describes a method of using a molded housing that carries a glass-plate with a beveled end, which is aligned using etched grooves in the molded housing that match the chip carrier. This technique may be adequate for large area optoelectronics, but would not be a suitable alignment methodology for small devices such as VCSELs.

Another assembly proposed in U.S. Pat. No. 4,756,590 granted Jul. 12, 1988 describes a method of using a 45-degree bevel-polished silicon v-groove sandwich of optical fibers that has optoelectronic devices glued over the bevel in line with the optical fibers. In the principal embodiment, the optical fibers are held in a block that is polished and beveled. The block is typically made from two silicon v-groove chips that sandwich the optical fibers between them. By polishing the end of the sandwich at 45-degrees and then applying a metallic mirror, the light is forced to reflect at 90-degrees and travel perpendicularly from the optical fibers through one of the silicon v-groove chips. It is, however, unclear how any measureable amount of light (for example: 1-milliwatt of 850-nm wavelength light—typical of a vcsel) can pass through a silicon v-groove chip since silicon is opaque. U.S. Pat. No. 4,756,590 also teaches the removal of part of one silicon v-groove chip by polishing until the longitudinal sides near the tips of the optical fibers are exposed. This is to allow closer access to the core of the optical fiber at the tip.

Finally, U.S. Pat. No. 4,756,590 describes that the optoelectronic devices must be glued against the silicon v-groove ferrule above the optical fiber in a face-down orientation. This completely rules-out a VCSEL chip since the vertical cavity laser would be damaged if bonded up-side-down, not to mention that the wirebond connections are made on the same surface as the vertical cavity laser and it would be physically impossible to wirebond to the VCSEL chip in such an orientation.

SUMMARY OF THE INVENTION

It is an object of the invention to provide an optical connector.

It is another object of the invention to provide a method for connecting a fiber to an optical or optoelectronic device.

It is another object of the invention to provide a method for adjusting a fiber with respect to an optical device.

This invention relates to the optical coupling of light emitted, absorbed or altered by optoelectronic devices (such as photodetectors, light emitting diodes, lasers, vertical cavity surface emitting lasers (VCSEL), etc.) with optical waveguides (such as optical fibers, planar waveguides, etc.). The invention facilitates the coupling procedure by using mechanical assemblies to hold the waveguides in contact with the optoelectronic devices. These assemblies do not require any other coupling agent, such as lenses, but must be sufficiently close in order to maximize the coupling efficiency into (or out of) the waveguide (optical fiber). Both assemblies are particularly amenable to a one-step alignment process involving the planar-on-planar (or stacked) 2-D alignment of the waveguide assembly with an optoelectronic assembly. The assemblies are stacked on top of each other and viewed from above to simultaneously observe features on both the waveguide assembly and the optoelectronic assembly. The alignment process involves sliding the two assemblies (waveguide assembly and optoelectronic assembly) with respect to each other on their co-incident 2-D surfaces. This procedure can be done passively (without energizing the optoelectronic assembly), and requires only one alignment step to be performed. This is contrary to other methods described in the prior art that use mechanical constraints, such as extra grooves, stop-walls, stand-offs, precision machining or precise pick-and-place methods to align waveguides to optoelectronic devices. It also supercedes older methods that rely on large optoelectronic devices to overcome slight misalignments of the optical fiber.

The essential aspect of the waveguide assembly described below is the 45-degree bevel at the tips of the waveguides (optical fiber). This feature allows for side-coupling of light into the core of the waveguide (optical fiber) by using the 45-degree bevel as a mirror surface. The light is initially directed at 90-degrees to the longitudinal direction of the optical fiber and travels through the cladding towards the center of the beveled tip. Total internal reflection at the 45-degree beveled tip forces the light to reflect at 90-degrees and couple along the longitudinal axis of the optical fiber. A metallic reflection coating can be applied to the beveled tip with an appropriate metal to enhance the coupling into the optical fiber. One of the earliest references of the 45-degree beveling of optical fiber can be found in U.S. Pat. No. 4,130,343 granted Dec. 19, 1978. In this patent, a single optical fiber is beveled at 45-degrees and placed in-contact over a single optoelectronic device. The embodiment described in this document uses this now common approach but improves the alignment method.

The embodiment in this document uses only one silicon v-groove chip and has a sacrificial sheet material (such as a glass plate) bonded over the optical fibers to keep them in place. The sheet material can be later thinned or removed completely by means such as chemical etching or mechanical polishing. The key aspect of removing the sheet material (glass plate) is to allow the beveled tips of the optical fibers to be observed. This is an essential part of the alignment procedure since the fiber tips must be well aligned with the optoelectronic devices as described earlier.

The embodiment in this document claims that the entire cover sheet can be removed and the entire longitudinal length of the optical fibers are exposed. Furthermore, the longitudinal length of the optical fibers may even be slightly over-polished into the cladding of the optical fibers to obtain an even closer proximity to the core.

In accordance with a first aspect of the invention, there is provided a method for manufacturing an optical connector assembly, comprising providing an assembly comprising at least one V-groove, inserting an optical fiber in each of the at least one V-groove provided in the assembly; providing a coating substance over at least one part of the assembly, in the vicinity of the at least one V-groove, sealing the optical fiber in each of the at least one V-groove provided in the assembly using the coating substance and a sheet material provided over the assembly surface to create a sealed assembly, polishing an end of the sealed assembly at a predetermined angle to enable a coupling of the optical fiber to an optical device using a total internal reflection to a planar coupling surface located on the sealed assembly, buffing at least the planar coupling surface of the assembly, placing the coupling surface on the optical device with the coupling surface abutting a planar window of the optical device, and adjusting a position of the assembly on the window to achieve the coupling.

According to a further broad aspect of the invention, there is provided an optical connector comprising a sealed assembly having at least one channel, each channel receiving an optical waveguide extending in a lengthwise direction, and having a beveled end at which the waveguide terminates, wherein light from the waveguide is reflected at the beveled end for lateral coupling, a layer of transparent material disposed between the channel and a side of the connector, the layer including a planar optical coupling surface, and a microlens positioned on the optical coupling surface to focus light communicated between the waveguide and an optical device.

According to yet a further broad aspect of the invention, there is provided an optical connector comprising a chip member having at least one V-groove on one side, an optical fiber bonded in each V-groove, and a beveled end at which the fiber terminates at a leading edge thereof, wherein light from the fiber is reflected at the beveled end for lateral coupling, and the optical fiber having some of its cladding removed on one lateral side to facilitate a greater optical coupling to the core once the core and optical device are aligned.

BRIEF DESCRIPTION OF THE DRAWINGS

Further features and advantages of the present invention will become apparent from the following detailed description, taken in combination with the appended drawings, in which:

FIG. 1 is a 3D perspective view which shows four optical fibers;

FIGS. 2a,b are a 3D perspective view and a front view which show an assembly which comprises four parallel optical fiber v-grooves;

FIGS. 3a,b are a 3D perspective view and a front view of an intermediate assembly which comprises four parallel optical fibers each located in one of the optical fiber v-grooves and an epoxy located on the four parallel optical fibers;

FIGS. 4a,b are a 3D perspective view and a front view of the intermediate assembly where a glass plate is used to flatten the epoxy;

FIGS. 5a,b are a 3D perspective view and a front view of the intermediate assembly where a protective epoxy is further added at each end of the assembly;

FIGS. 6a,b are a 3D perspective view and a front view of the intermediate assembly where a front beveled face has been polished and a back flat face has been polished;

FIGS. 7a,b are a 3D perspective view and a front view which shows the intermediate assembly where the glass plate has been polished away;

FIG. 8 is a profile view of the preferred embodiment of the optical connector assembly;

FIGS. 9a,b are a first perspective view of the front face of the optical connector assembly where a perfect polish has been done and a second perspective view of the front face of another over-polished connector assembly;

FIGS. 10a,b,c,d are a 3D perspective view, a top view, a side view and a back view of another embodiment of the invention where the connected assembly is plastic-micro molded;

FIG. 11 is a 3D perspective view of the other embodiment of the invention where four optical fibers are inserted;

FIG. 12 is a 3D perspective view of the other embodiment of the invention where epoxy is used to fix the four optical fibers;

FIG. 13 is a 3D perspective view of the other embodiment of the invention where a front beveled face has been polished;

FIG. 14 is a 3D perspective view of the other embodiment of the invention where the bottom of the assembly has been flat polished to exposed the optical fibers;

FIG. 15 is a 3D perspective view which shows an optical ferrule in the vicinity of an optoelectronic device;

FIGS. 16*a,b* are a 3D perspective view and a top view of an optical ferrule seated on a transparent material located between the optical ferrule and an optoelectronic chip;

FIGS. 17*a,b* are another 3D perspective view and top view of an optical ferrule seated on a transparent material located between the optical ferrule and an optoelectronic chip which the optical ferrule is closer to the optoelectronic chip;

FIGS. 18*a,b* are a 3D perspective view and top view of an optical ferrule seated on a transparent material enabling an optical coupling between the optical ferrule and the optoelectronic chip;

FIG. 19 is a side view of the optical ferrule seated on the transparent material which shows the optical coupling between the optical ferrule and the optoelectronic chip;

FIG. 20 is a top view of a transparent substrate which comprises four patterned microlenses;

FIG. 21 is a 3D perspective view of an optical ferrule seated on a transparent material enabling an optical coupling between the optical ferrule and the optoelectronic chip where the transparent material comprises patterned microlenses;

FIGS. 22*a,b* are a zoom-in of a side view and a front view of the optical coupling using patterned microlenses; and FIG. 23 is a side view of an optical ferrule seated on a transparent material enabling an optical coupling between the optical ferrule and the patterned microlenses.

It will be noted that throughout the appended drawings, like features are identified by like reference numerals.

DETAILED DESCRIPTION OF THE PREFERRED EMBODIMENT

The parallel optical connector is a mechanical structure used to connect a parallel optical fiber ribbon to an array of optoelectronic devices, such as a vertical cavity surface emitting laser (VCSEL), or photodetector array.

The parallel optical connector consists of a structure to rigidly hold optical fibers in the same plane and pitched from each other at 250-microns. One end of the structure is polished at a 45-degree angle to create a reflective glass-air interface at the fiber tips. This interface can reflect light at 90-degrees by either total internal reflection (TIR) when the glass-air interface is preserved, or by depositing a reflective metal layer on the exposed tips of the fiber. The reflective metal layer may be made of gold, silver, etc.

Light directed at the 45-degree tips of the optical fiber will be reflected and coupled into the optical fiber orthogonal to the initial direction. In this situation, light will pass though the side of the optical fiber, through the cladding and reflect off the 45-degree tip, due to TIR or the metallic surface, into the core of the optical fiber. Conversely, when light is already in the core and traveling towards the 45-degree polished tip, it reflects off the 45-degree tip, due to TIR or the metallic surface, and is directed normal to the optical fiber passing through the cladding and out of the side of the optical fiber.

The opposite end of the structure has the optical fibers leave as a parallel ribbon cable.

Primary Embodiment—Silicon V-Groove

The parallel optical connector is comprised of 6 elements, one of which is used as a sacrificial element and is not present in the final assembly. The elements are described as: a silicon v-groove chip, optically transparent epoxy, protective epoxy, parallel optical fiber ribbon, an evaporated metal layer, and a sacrificial cover plate. The sacrificial cover plate is typically made of glass.

A parallel optical fiber ribbon (2) typically has several optical fibers (6) within protective polymer jackets (4) that keep them roughly pitched at 250-microns, however this is not precise. The end portions, approximately 2-cm long, of the protective polymer jackets of the optical fiber ribbon (6) are stripped and clean—using standard means—to produce 2-cm long segments of separated parallel optical fibers (i.e. only the glass), still roughly pitched at 250-microns but not touching each other. The segment of bare optical fiber remains part of the ribbon cable, as shown in FIG. 1.

The silicon v-groove chip (8) is on the order of 1-cm×1-cm×0.2-cm in dimensions and has been chemically etched on one of the large surfaces to produce v-shaped grooves in the silicon (10), as shown in FIG. 2.

The process of creating v-grooves in crystalline silicon is well known and described in the literature. The v-groove structure is used in this case to maintain two essential features. A first essential feature is that the optical fibers must be pitched from each other at precisely 250-microns, while a second essential feature is that the optical fibers must remain in precisely the same plane.

In this description, the v-groove dimensions are made such that the optical fibers form a three-point contact with the sides of the v-grooves.

The v-groove chip, the optical fiber, the transparent optical epoxy and the cover plate are now assembled together to form the ferrule. A small quantity of transparent epoxy (12) is placed in the center of the v-grooves (10) on the chip (8) in FIG. 3*a,b*. The bare optical fibers are then carefully placed in the v-grooves with one end protruding past the silicon chip by ~2-mm and the other end still connected to the ribbon cable. A cover plate, approximately 1-cm×1-cm×0.1-cm (14), is then placed over the optical fibers in the v-grooves and pressed together to sandwich the optical fibers in place in FIG. 4*a,b*. The epoxy is either heat, time or UV-cured. Note that the exact placement and the size of the cover plate are unimportant as long as the cover plate is larger than the silicon chip.

Once the epoxy joining the cover plate to the silicon chip has hardened, the tips of the optical fibers, within the v-grooves, are coated with a small amount of epoxy (16) to protect them during the polishing process. The side where the optical fibers lead out of the chip and continue on as a ribbon cable have epoxy placed around the bare optical fiber near the chip as well so that the assembly is more robust during polishing, as shown in FIG. 5*a,b*.

The ferrule is then placed on a polishing machine such that it is held at a 45-degree angle to the surface of the polisher with the corner of the silicon chip polishing first and progressively towards the cover plate. This creates the 45-degree angled polish of the optical fibers (18), as shown in FIG. 6*a,b*. Standard lapping and polishing techniques must be applied, including progressively finer grits of polishing paper, correct timing, appropriate slurry mixtures, and a method of holding the parts in a rigid manner.

A thin metallic coating can be applied to the 45-degree beveled surface to create a mirrored surface on the inside region of the optical fiber. The metallic coating can be made of gold, silver, etc.

The rest of this application will assume no metallic coating, but there is no difference to the procedure if one is included at this point.

To remove the cover plate, several methods could be used. The cover plate could be made of a material that would not adhere to the epoxy or silicon v-groove chip. The plate could then be mechanically removed after the epoxy had secured the optical fibers in place. This may or may not result in a suitable optically flat surface, and polishing (buffing) still might be required. The cover plate might also be made of a material that could be chemically dissolved, leaving the fibers, epoxy and glue unaffected. This also may or may not result in a suitable optically flat surface, and polishing (buffing) still might be required.

The preferred method will assume that the cover plate must be removed by polishing. The ferrule is then placed on a polishing machine such that the large exposed surface of the cover plate is in contact with the polishing surface. The cover plate is then lapped and polished until it has been completely worn away leaving only the polished flat surface of the silicon chip and optical fibers embedded in optical epoxy within the v-grooves (20), as shown in FIG. 7a,b. A to-scale profile view of the connector (23a) is provided in FIG. 8.

During the polishing step to remove the cover plate, an over-polish can be applied to the surface (20). Over-polishing creates a flat side along the outside the optical fibers in the v-grooves (22). This is advantageous because it allows the light to be coupled closer to the core of the optical fiber, resulting in higher coupling efficiency. The over-polish also allows a more flexible tolerance during the polishing step; a distance of between 0 to 25-microns can be polished into the optical fiber's cladding before damaging the core, as shown in FIG. 9b.

During the polishing step to remove the cover plate, an under-polish can also be applied to the surface (20). An under-polish simply leaves some thickness of the cover plate in tact and over the optical fibers. If the cover plate is glass, this can be done to help with optical distance requirements to a lens or other type structures.

Alternative Embodiment—Molded Plastic

The structure used to hold the optical fibers may be fabricated from other materials and other assembly methods could be used. The mechanical structure that holds the optical fibers in the same plane and pitched 250-microns from each other can be based on precision micro-molding techniques of plastic.

This version of the parallel optical connector is comprised of 3 elements. The elements are described as: an injection-molded plastic ferrule, optically transparent epoxy, and parallel optical fiber ribbon.

The plastic ferrule is a piece that is on the order of 1-cm× 1-cm×0.3-cm in size (24). It is a hollow plastic box with one side open into which the optical fibers are inserted. The opposite side has a linear array of 125-micron diameter holes pitched at 250-microns. The holes bore into the plastic approximately 0.05-cm and are used to align the tips of the optical fiber (23). Inside the box, a flat surface is used to keep the optical fibers equal or higher than the array of holes. The others interior sides of the box are tapered towards the array of holes to better guide the fibers into the holes during their insertion (26). The plastic ferrule has one or more injection openings in which to inject epoxy (25), as shown in FIG. 10a,b,c,d.

A similar parallel optical fiber ribbon, as shown in FIG. 1, is also used for the plastic molded embodiment.

The array of bare optical fibers is inserted into the plastic ferrule from the open end (26). The fibers are pushed through the holes and protrude from the end of the plastic ferrule, as shown in FIG. 11.

Transparent epoxy (27) is then injected into the injection openings (25) and the optical fibers are pushed and pulled back and forth to ensure that the epoxy has well coated all the fibers within the array of holes. Epoxy is then applied to the outside of the array of holes where the optical fibers are protruding. The epoxy is then cured by heat, time, or UV light, as shown in FIG. 12.

The ferrule is then placed on a polishing machine such that it is held at a 45-degree angle to the surface of the polisher with the corner of the facet containing the array of holes polishing first (28) and progressively towards a plane below the optical fibers such that the optical fibers have been completely beveled at 45-degrees (29), as shown in FIG. 13. Standard lapping and polishing techniques must be applied, including progressively finer grits of polishing paper, correct timing, appropriate slurry mixtures, and a method of holding the parts in a rigid manner.

Again, a metallic coating can be applied to the 45-degree beveled surface. Although the rest of this document will assume no metallic coating is used.

The plastic ferrule is then placed on a polishing machine such that the larger exposed surface (30) is in contact with the polishing surface. The larger area is lapped and polished until the sides of the optical fibers have been exposed from end to end, as shown in FIG. 14.

Again, over-polishing of the large flat surface (30) can be advantageous at this point.

APPLICATIONS

The complete connector described above and shown in FIG. 8 can be used in applications involving the direct coupling of light from a micro-laser, such as a VCSEL, into an optical fiber. Conversely, coupling light out of an optical fiber onto a photodetector, such as a PIN diode, can also be done. The connector can also be used to couple light into optical elements, such as a micro-lens array.

The main attributes of the coupling method are:
1) The simplified alignment obtained by stacking and then aligning using two co-planar surfaces.
2) The ability to precisely position the parallel optical connector over another component by direct observation above the two parts using the 45-degree bevel to simultaneously observe both the optical fiber tips and the component below.

The polished surface allows a co-planar and stackable alignment procedure. This reduces the number of mechanical degrees of freedom from 6 to only 3; lateral-x, lateral-y and rotational-z. The 45-degree bevel allows both the connector and the target to be observed simultaneously without disturbing the components. A slight offset may result because the beveled tips of the optical fibers do not allow direct viewing through them. However, other edge-features, such as the edges of the v-grooves, can be used to locate the fibers over the chip. Extra v-grooves without optical fibers or other fiducial markings that can be observed on the beveled side of the ferrule may also be included to help with alignment registration between the ferrule and the part in contact with the ferrule. This is similar to methods employed with mask alignment in photolithographic processes used to produce microchips, although with much less stringent alignment accuracy. Thus it will be appreciated that the object of observation during alignment need not be the fiber core(s) near the edge of the assembly on the coupling window and covering the visibility of the VCSELs or other optoelectronic devices, but another fiducial mark or etching on the assembly edge matched with a mark on the coupling window.

Coupling to an Optoelectronic Device

The parallel optical connector can be connected to any optoelectronic device (32) that emits light orthogonal to the direction of the optical fibers in the ferrule, as shown in FIG. 15. However, when the ferrule is aligned with an optoelectronic device that has a flat, co-planar window above its active region, the full advantage of the alignment aspects described above can be realized.

The following describes a typical alignment procedure:

The packaged optoelectronic chip consists of a substrate (31), trace lines, wirebonds, a chip (32) with light emitting devices (33), and a method of providing a flat, co-planar optical window above the active region of the optoelectronic chip (34), as described in co-pending US patent application entitled "Encapsulated Optical Package", bearing attorney docket number 16005-3US.

The parallel optical connector, shown in FIG. 8, is first placed directly over the flat, co-planar window of the optoelectronic chip, as shown in FIG. 16, with a reasonably accurate position.

An observing microscope or magnifying camera is placed directly above the two parts to simultaneously view the chip and the ferrule positions.

The ferrule is then moved laterally in the x-axis, laterally in the y-axis and rotated about z-axis until the centers of the optical fibers are directly over top of the center of the lasers, as shown in FIGS. 16a,b and 17a,b. This procedure may use an automated or manual micropositioner and also may require that the microscope magnification and depth of focus be occasionally adjusted. These adjustments depend greatly on the desired accuracy.

Once the ferrule is in place (35) over the emitting lasers (33) as shown in FIG. 18a,b, the ferrule can be epoxied in place. A profile view of the connector aligned over a packaged optoelectronic chip is shown in FIG. 19. The optoelectronic package also shows the relative placement of wirebonds (37) and trace lines (36).

Coupling to an Optical Element—Microlenses

Although the previous embodiments do not specify the use of multimode or single mode optical fiber, the physical structure of the previous embodiments imply the use of a relative large optical target such as a multimode optical fiber core of 62.5-microns. In this application where a lens structure is used, a smaller target, such as a single-mode optical fiber core of only 8-microns (effective field diameter), is possible. The lens structure focuses the light into a smaller spot closer to the diameter of the single-mode optical fiber core.

The identical procedure can be used to align the connector with an optical element such as an array of microlenses. What will be described is when the connector is to be aligned to a linear array of patterned Fresnel microlenses (38).

The linear microlens array (38) will contain the same number of lenses, as there are optical fibers in the connector. They are placed on the bottom of a glass plate (39), as shown in FIG. 20, that has a thickness that will allow each lens to capture all the light from their respective optical fiber and collimate the light. Any appropriate optical system can then be constructed subsequent to this first lens.

Similar to the previous explanation, the parallel optical connector, as shown in FIG. 8, is first placed directly over the flat, co-planar glass plate on the opposite side from the lenses, as shown in FIG. 21, with a reasonably accurate, but random, position.

Once the ferrule is in place (35) over the emitting lasers (33) as shown in FIG. 18a,b, the ferrule can be epoxied in place. A profile view of the connector aligned over a packaged optoelectronic chip is shown in FIG. 19. The optoelectronic package also shows the relative placement of wirebonds (37) and trace lines (36).

Coupling to an Optical Element—Microlenses

Although the previous embodiments do not specify the use of multimode or single mode optical fiber, the physical structure of the previous embodiments imply the use of a relative large optical target such as a multimode optical fiber core of 62.5 microns. In this application where a lens structure is used, a smaller target such as a single-mode optical fiber core of only 8-microns (effective field diameter), is possible. The lens structure focuses the light into a smaller spot closer to the diameter of the single-mode optical fiber core The identical procedure can be used to align the connector with an optical element such as an array of microlenses. What will be described is when the connector is to be aligned to a linear array of patterned Fresnel microlenses (38).

The linear microlens array (38) will contain the same number of lenses, as there are optical fibers in the connector. They are placed on the bottom of a glass plate (39), as shown in FIG. 20, that has a thickness that will allow each lens to capture all the light from their respective optical fiber and collimate the light. Any appropriate optical system can then be constructed subsequent to this first lens.

Similar to the previous explanation, the parallel optical connector, as shown in FIG. 8, is first placed directly over the flat, co-planar glass plate on the opposite side from the lenses, as shown in FIG. 21, with a reasonably accurate, but random, position.

An observing microscope or magnifying camera is placed directly above the two parts to simultaneously view the glass plate with the microlenses and the ferrule positions.

The ferrule is then moved laterally in the x-axis, laterally in the y-axis and rotated about z-axis until the centers of the optical fibers are directly over top of the center of the microlenses.

Once the ferrule is in place, the connector can be epoxied in place. A close-up of the side and front views of the tips of the optical fibers aligned over the microlens array is shown in FIG. 22a,b. The dashed lines (40) indicate the rays of light that are being coupled into (or out of) the optical fibers. A to-scale side view of the ferrule located over the micro-lens array is shown in FIG. 23.

If the depth of focus used to view both the ferrule and the microlens array is too great, other techniques can be used to maintain one imaging plane, such as: the illumination of the microlens plate from behind using collimated light to produce focused spots essentially at the beveled tips of the optical fibers. The spots and the tips of the optical fibers can then be viewed simultaneously.

The embodiments of the invention described above are intended to be exemplary only. The scope of the invention is therefore intended to be limited solely by the scope of the appended claims.

We claim:

1. A method for manufacuturing an optical connectot assembly, comprising:
   proving a substrate;
   embedding at least one optical fiber in the substrate;

covering the substrate with a sacrificial cover plate to seal the at least one optical fiber between the substrate and the sacrificial cover plant and to provide an intial assembly;

polishing a first end of said intial assembly at a predetermined angle to enable an optical coupling between said at least one optical fiber and at least one optical device using an optical reflection through a planar coupling surface located on said intial assembly; and at least partially removing said sacrificial cover plate to expose at least a portion of said planar coupling surface of said intial assembly which allows said coupling.

2. The method as claimed in claim 1 wherein said comprises:

providing the substrate with at least one V-groove;

inserting an optical fiber in each of the at least one V-groove;

and wherein the covering comprises: providing an epoxy coating substance over at least one part of said substrate, in the vicinity of the at least one V-groove; and sealing the optical fiber in each of the at least one V-groove provided in the substrate using the epoxy coating substance, and the sacrificial cover plate provided over said coupling surface and over the at least one V-groove, to ensure each said optical fiber is correctly placed and bonded within said at least one V-groove to create said initial assembly; and wherein said polishing of said first end of said initial assembly at a predetermined angle provides a bevelled surface on said initial assembly and thereby also provides a bevelled surface on each said optical fiber at the first end of said assembly.

3. The method as claimed in claim 1 wherein the at least partially removing said sacrificial cover plate comprises completely removing said sacrificial cover plate from said initial assembly.

4. The method as claim in claim 1, wherein said cover plate is a transparent sheet of material.

5. The method as in claim 1, further comprising placing said planar coupling surface on said optical device with said planar coupling surface abutting a planar window of said optical coupling.

6. The method as in claim 5 further comprising using references on said optical device and said intial assembly to adjust a position of said intial assembly over said planar window to achieve said optical coupling.

7. The method as claimed in claim 2, wherein the epoxy coating substance is light activated, further comprising the step of light activating the epoxy coating substance until is has solidified.

8. The method as claimed in claim 4, wherein the transparent sheet of material provides for said coupling surface.

9. The method as claimed in claim 2, wherein said at least one V-groove comprises a plurality of fibers inserted in a plurality of parallel V-grooves.

10. The method as claimed in claim 2, wherein the at least one V-groove is etched in silicon.

11. The method as claimed in claim 6, wherein least one of the references is a fudicial mark is a fiducial mark or an etching on at least one of said intial assembly and said intial assembly and said optical device.

12. The method as claimed in claim 5 wherein the sacrificial cover plate is a transparent sheet of material and wherein the step of placing said planar coupling surface of said initial assembly on said optical device with said planar coupling surface abutting a planar window of said optical device comprises the using at least a part of the transparent sheet of material between said planar coupling surface and said planar window of said optical device as a coupling surface.

13. The method as claimed in claim 12, wherein the optical device comprises a VCSEL.

14. The method as claimed in claim 12, wherein the optical device comprises a microlens provided at a distance from the initial assembly that enables a capture of all light originating from a corresponding optical fiber and collimates all the light into the optical device.

15. The method as claimed in claim 1, wherein said at least one optical fiber comprises a plurality of fibers arranged as a ribbon cable.

16. The method as claimed in claim 1, wherein the at least partially removing said sacrificial cover plate comprises buffing said planar coupling surface of said initial assembly.

17. The method as in claim 1, wherein said at least partially removing comprises chemically treating said sacrificial cover plate.

18. The method as in claim 1, wherein said at least partially removing comprises at least one of lapping and polishing said sacrificial cover date.

* * * * *